United States Patent [19]
Matsuura et al.

[11] Patent Number: 5,982,730
[45] Date of Patent: Nov. 9, 1999

[54] SWITCHING APPARATUS USING PLAY BACK INFORMATION FROM AN OPTICAL DISK

[75] Inventors: Makoto Matsuura; Takeshi Nakayama; Katsuaki Nakajima, all of Tokyo, Japan

[73] Assignee: Taiyo Yuden Co., Ltd., Tokyo, Japan

[21] Appl. No.: 08/893,486

[22] Filed: Jul. 11, 1997

Related U.S. Application Data

[63] Continuation of application No. 08/694,838, Aug. 9, 1996, abandoned, which is a continuation of application No. 08/531,284, Sep. 20, 1995, abandoned, which is a continuation of application No. 08/022,023, Feb. 25, 1993, abandoned.

[30] Foreign Application Priority Data

| Feb. 28, 1992 | [JP] | Japan | H4-009639 U |
| Feb. 28, 1992 | [JP] | Japan | H4-044052 |
| Feb. 28, 1992 | [JP] | Japan | H4-044066 |
| Feb. 28, 1992 | [JP] | Japan | H4-044078 |
| Jun. 3, 1992 | [JP] | Japan | H4-142386 |
| Jun. 3, 1992 | [JP] | Japan | H4-142389 |

[51] Int. Cl.[6] .................................................. G11B 31/00
[52] U.S. Cl. ........................................... 369/69; 369/20
[58] Field of Search ........................... 369/69, 273, 292, 369/19, 20, 44.11, 50; 434/308, 309, 310, 314, 315, 316, 317, 318

[56] References Cited

U.S. PATENT DOCUMENTS

| 3,829,207 | 8/1974 | Licitis | 369/273 |
| 3,930,654 | 1/1976 | Nessel | 369/273 |
| 4,043,651 | 8/1977 | Livingston | 369/273 |
| 4,122,613 | 10/1978 | Karalus et al. | 369/69 |
| 4,245,404 | 1/1981 | Yoshinari | 369/273 |
| 4,470,675 | 9/1984 | DiGianfilippo et al. | 434/316 |
| 4,706,237 | 11/1987 | Nakayama | 369/292 |
| 4,769,806 | 9/1988 | Takamori | 369/292 |
| 4,959,734 | 9/1990 | Foster | 434/318 |
| 4,968,254 | 11/1990 | Gangwere, Jr. et al. | 434/316 |
| 5,065,345 | 11/1991 | Knowles et al. | 434/308 |
| 5,095,475 | 3/1992 | Ishikawa | 369/50 |
| 5,103,317 | 4/1992 | Nomura | 369/50 |
| 5,219,291 | 6/1993 | Fong et al. | 434/309 |
| 5,234,346 | 8/1993 | Rice | 434/316 |

FOREIGN PATENT DOCUMENTS

| 366449 | 5/1990 | European Pat. Off. | 434/314 |

*Primary Examiner*—David L. Ometz
*Attorney, Agent, or Firm*—Pollock, Vande Sande & Amernick

[57] ABSTRACT

The on/off statuses of relays corresponding to information played back from an optical disk, for example, position information such as absolute time and track number, are stored in memory. When the absolute time or track number in the sub-code information decoded by the sub-code decode circuit is identical to the absolute time or track number stored in memory, the relays in the external device interface unit are switched to control the external devices connected to them. With this arrangement, external devices such as lights, slide projector, and illumination may easily be controlled in synchronization with optical disk playback information.

8 Claims, 17 Drawing Sheets

(a)

(b)

(c)

| Apparatus | 3'A | 3'B | 3'C | 3'D |
|---|---|---|---|---|
| Relay | 1 -------- 8 | 1 -------- 8 | 1 -------- 8 | 1 -------- 8 |

Track number: 1 ... 8, 9 ... 16, 17 ... 24, 25 ... 32

FIG.15

SWITCHING APPARATUS USING PLAY BACK INFORMATION FROM AN OPTICAL DISK

This application is a continuation of U.S. patent application Ser. No. 08/694,838, filed Aug. 9, 1996, abandoned, which is a continuation of U.S. patent application Ser. No. 08/531,284, filed Sep. 20, 1995, abandoned, which is a continuation of U.S. patent application Ser. No. 08/022,023, filed Feb. 25, 1993, abandoned.

BACKGROUND OF THE INVENTION

This invention relates to a drive switching apparatus using optical disk playback information, and more particularly, to a drive switching apparatus using optical disk playback information which is capable of driving and controlling external devices on the basis of said optical disk playback information.

To permit unstaffed explanation when explaining merchandise or exhibits at an exhibition, museum, etc., magnetic tape players, etc., are conventionally provided for each article of merchandise or exhibit wherein the explanation previously recorded on an endless magnetic tape is output in audio form from speakers.

One method of explaining merchandise or exhibits in a predetermined order is to provide spotlights and magnetic tape players for respective articles of merchandise or exhibits and to control these spotlights and magnetic tape players with timers. Another method is to record explanations for respective articles of merchandise or exhibits sequentially on a single magnetic tape and at the same time to record a predetermined audio signal following the explanation for each article of merchandise or exhibit, said signal being detected to switch the spotlights.

When explanations are played back using a magnetic tape player as described above, it is not possible to instantaneously access the start position of an explanation. When spotlights and magnetic tape players for respective article of merchandise or exhibits are controlled by means of timers, it is extremely difficult to synchronize the lights with the explanations recorded on the magnetic tapes, resulting in presentation problems such as annoyance to visitors because the start position of an explanation does not coincide with the light.

SUMMARY OF THE INVENTION

The object of this invention is to provide a drive switching apparatus capable of controlling external devices in synchronization with the played back information from an optical disk capable of instantaneously accessing any position.

To achieve the above object, the drive switching apparatus using optical disk playback information according to the first invention comprises an information playback means for playback of information stored on an optical disk, an external device interface means including at least one switch connectable to an external device, and a switching control means for selectively switching the on/off status of the switch.

According to the first invention, information stored on an optical disk is played back by the information playback means, the on/off status of switch included in the external device interface means is selectively switched by the switching control means on the basis of the playback information, and the drive/stop status of the external device connected to the switch in the external device interface means is switched.

With this arrangement, an external device may be controlled in synchronization with optical disk playback information. When explanations for multiple exhibits are sequentially performed, for example, it is possible to synchronize the explanation for each exhibit with the lighting if the explanations are previously recorded on an optical disk and the lighting of each exhibit is switched on the basis of this playback information, eliminating annoyance to visitors, unlike the prior art.

The drive switching apparatus using optical disk playback information according to the second embodiment of this invention is configured with the drive switching apparatus using optical disk playback information according to the first embodiment of this invention, wherein the information reproducing means includes a position information reproducing means for reproducing position information from an optical disk on which information including position information is stored, and wherein a position information register means for registering at least one piece of position information or one position information range and a comparison means for comparing the position information played back from the optical disk with the position information or position information range registered in the position information register means are provided, said switching control means selectively switching the on/off status of the switch on the basis of the comparison result of the comparison means.

According to the second invention, position information such as track number information and absolute time information is played back from an optical disk by the position information playback means. As absolute time information, the absolute time disclosed in Japanese Patent Laid-Open Publication No. 103454/1988 (U.S. Pat. No. 5,023,856) or Japanese Patent Laid-Open Publication No. 224929/1989 (U.S. Pat. No. 4,999,825) may be used, for example. Any position information or position information range on the optical disk is registered by the position information register means. The registered position information or position information range is compared by the comparison means with the position information played back from the optical disk. On the basis of this comparison result, the on/off status of the switch in the external device interface means is selectively switched by the switching control means to switch the drive/stop status of the external device connected to the switch in the external device interface means.

With this arrangement, the drive/stop status of an external device may be controlled in synchronization with the position information played back from an optical disk. When explanations for multiple exhibits are sequentially performed, for example, the explanation and the lighting of each exhibit may be synchronized if the explanations are stored on an optical disk and the lighting of each exhibit is switched on the basis of the position information of the start or end position of the explanation, eliminating annoyance to visitors, unlike the prior art. By registering a position information range, malfunction of the external device may be prevented even if the drive start position of the external device fails to be detected due to some error because the external device is driven if it is decoded that the position information is within the registered position information range between the drive start and end positions.

The drive switching apparatus using optical disk playback information according to the third invention is configured with the drive switching apparatus using optical disk playback information according to the first invention, wherein the information playback means includes a position information playback means for playback position information from an optical disk on which information including position information is stored. Also a pattern storing means is provided for storing the on/off status of the switch corresponding to predetermined position information and the position information as a switching program pattern and a comparison means for comparing the position information played back from the optical disk with the position information stored in the pattern storing means, the switching control means selectively switching the on/off status of the switch in the external device interface means on the basis of the comparison result of the comparison means and the switching program pattern.

According to the third invention, position information such as track number information and absolute time information is played back from an optical disk by the position information playback means. The on/off status of the switch corresponding to predetermined position information on the optical disk and the position information are stored by the pattern storing means as a switching program pattern. The position information stored as the switching program pattern is compared by the comparison means with the position information played back from the optical disk. On the basis of this comparison result and the switching program pattern, the on/off status of the switch in the external device interface means is selectively switched to switch the drive/stop status of the external device connected to the switch in the external device interface means.

With this arrangement, an external device may be controlled in synchronization with the information played back from an optical disk. When explanations for multiple exhibits are sequentially performed, for example, the explanation and the lighting of each exhibit may be synchronized if the explanations are recorded on an optical disk and the lighting of each exhibit is switched on the basis of the playback information, eliminating annoyance to visitors, unlike the prior art. Also, because the switching program pattern for switching the external device is previously stored in the pattern storing means, operation is extremely simple.

The drive switching apparatus using optical disk playback information according to the fourth invention is configured with the drive switching apparatus using optical disk playback information according to the second invention. A pattern storing means for storing the on/off status of the switch corresponding to predetermined position information as a switching program pattern and a comparison object selection means for selecting either the registered contents in the position information register means or the stored contents of the pattern storing means are provided, the comparison means comparing the contents selected by the comparison object selection means with the position information played back from the optical disk.

According to the fourth invention, the on/off status of the switch corresponding to predetermined position information on the optical disk and the position information are stored as a switching program pattern by the pattern storing means. One of the position information stored as the switching program pattern, position information and position information range registered in the position information register means is selected by the comparison object selection means. The selected contents are compared by the comparison means with the position information played back from the optical disk. On the basis of this comparison result, the on/off status of the switch in the external device interface means is selectively switched by the switching control means.

With this arrangement, in addition to the above effect, operability is further improved because the on/off status of the switch corresponding to predetermined position information on the optical disk and the position information are stored as a switching program pattern by the pattern storing means, and any one of the pieces of position information stored as a switching program pattern, position information and position information range registered in the position information register means may be selected.

The drive switching apparatus using optical disk playback information according to the fifth invention is configured with the drive switching apparatus using optical disk playback information according to the second or fourth invention, wherein an alarm means is provided for issuing an alarm if the unregistered area of the position information register means is equal to or less than a predetermined standard value.

According to the fifth invention, the alarm means issues an alarm if the unregistered area of the position information register means is equal to or less than a predetermined standard value.

With this arrangement, in addition to the above effect, there is no possibility of the register area being used up before one becomes aware of it because the alarm means issues an alarm if the unregistered area of the position information register means is equal to or less than a predetermined standard value.

The drive switching apparatus using optical disk playback information according to the sixth invention is configured with the drive switching apparatus using optical disk playback information according to the second, third, fourth, or fifth Inventions, wherein the switching control means selectively switches the on/off status of the switch in the external device interface means when the comparison result of the comparison means is in an identical status and said identical status continues for a predetermined time.

With the sixth invention, the on/off status of the switch in the external device interface means is selectively switched by the switching control means on the basis of the comparison result when the comparison result of the comparison means is in an identical status and said identical status continues for a predetermined time.

With this arrangement, in addition to the above effect, when the detected position information is the same continuously for a predetermined time, the on/off status of the switch is controlled corresponding to this position information. Even if the optical disk surface is damaged or soiled and correct position information fails to be detected, no operation other than the expected operation will be performed. Also, when track search is performed, because playback for searching is performed only for a very short time, multiple switching operation of the switch will not be performed within this short time period, thus preventing the external device from malfunctioning.

The drive switching apparatus using optical disk playback information according to the seventh invention is configured with the drive switching apparatus using optical disk playback information according to the second, third, fourth, fifth, or sixth inventions, wherein a pulse signal generating means is provided for externally outputting a predetermined pulse signal on the basis of the comparison result of the comparison means.

With the seventh invention, a pulse signal is externally output by the pulse signal generating means on the basis of the comparison result of the comparison means when the comparison result is in an identical status, for example.

With this arrangement, in addition to the above effect, because a pulse signal is externally output by the pulse signal generating means on the basis of the comparison result of the comparison means, it is easy to perform switching of an external device such as slide projector whose drive status may be switched by inputting a pulse signal.

The drive switching apparatus using optical disk playback information according to the eighth invention is configured with an information input means for inputting information output from an optical disk player, an external device interface means including at least one switch connectable to an external device, and a switching control means for selectively switching the on/off status of the switch on the basis of the information input by the information input means.

With the eighth invention, the playback information output from the optical disk player is input by the information input means, and the on/off status of the switch included in the external device interface means is selectively switched by the switching control means on the basis of the playback information input by the information input means. Subsequently, the drive/stop status of the external device connected to the switch of the external device interface means is switched on the basis of the playback information.

With this arrangement, an external device may be controlled in synchronization with the information played back from an optical disk. When explanations for multiple exhibits are sequentially performed, for example, the explanation and the lighting of each exhibit may be synchronized if the explanations are recorded on an optical disk and the lighting of each exhibit is switched on the basis of the playback information, eliminating annoyance to visitors, unlike the prior art. Also, because the drive switching apparatus is configured independently of an optical disk player, a general-purpose optical disk player capable of externally outputting information played back from an optical disk may be connected and used, allowing the drive switching apparatus to be widely employed. The CPU capabilities incorporated into the optical disk player such as remote control, random play, and program play may also be used.

A drive switching apparatus using optical disk playback information according to the ninth invention which is connected to an optical disk player comprising a position information playback means for reproducing position information from an optical disk on which information including the position information is stored and an information output means for externally outputting the position information, is configured with an information input means for inputting position information from the optical disk player, a position information register means for registering at least one piece of position information or one position information range, a comparison means for comparing the position information input from the information input means with the position information or position information range registered in the position information register means, an external device interface means including at least one switch connectable to an external device, and a switching control means for selectively switching the on/off status of the switch in the external device interface means on the basis of the comparison result of the comparison means.

According to the ninth invention, position information such as track number information and absolute time information played back from an optical disk is input from the optical disk player by the information input means. Any position information or position information range on the optical disk is registered by the position information register means. The registered position information or position information range is compared by the comparison means with the position information played back from the optical disk. On the basis of this comparison result, the on/off status of the switch in the external device interface means is switched by the switching control means to switch the drive/stop status of the external device connected to the switch in the external device interface means.

With this arrangement, an external device may be controlled in synchronization with the position information played back from an optical disk. When explanations for multiple exhibits are sequentially performed, for example, the explanation and the lighting of each exhibit may be synchronized if the explanations are recorded on an optical disk and the lighting of each exhibit is switched on the basis of the position information of the start or end position, eliminating annoyance to visitors, unlike the prior art. By registering a position information range, malfunction of the external device may be prevented even if the drive start position of the external device fails to be detected due to some error because the external device is driven if it is detected that the position information is within the registered position information range from the drive start and end positions. Also, because the drive switching apparatus is configured independently of an optical disk player, a general-purpose optical disk player capable of externally outputting information played back from an optical disk may be connected and used, allowing the drive switching apparatus to be widely employed. The CPU capabilities incorporated into the optical disk player such as remote control, random play, and program play may also be used.

A drive switching apparatus using optical disk playback information according to the tenth invention which is connected to an optical disk player comprising a position information playback means for reproducing position information from an optical disk on which information including the position information is stored and an information output means for externally outputting the position information, is configured with an information input means for inputting the position information from the optical disk player, an external device interface means including at least one switch connectable to an external device, a pattern storing means for storing the on/off status of the switch corresponding to predetermined position information and the position information as a switching program pattern. Also a comparison means is provided for comparing the position information input by the information input means with the position information stored in the pattern storing means, and a switching control means for selectively switching the on/off status of the switch in the external device interface means on the basis of the comparison result of the comparison means and the switching program pattern.

According to the tenth invention, position information such as track number information and absolute time information played back from an optical disk is input from the optical disk player by the information input means. The on/off status of the switch corresponding to predetermined position information on the optical disk and the position information are stored as a switching program pattern by the pattern storing means. The position information stored as the switching program pattern is compared, by comparison means, with the position information input by the information input means. On the basis of this comparison result, the on/off status of the switch in the external device interface means is selectively switched by the switching control means to switch the drive/stop status of the external device connected to the switch in the external device interface means.

With this arrangement, an external device may be controlled in synchronization with the position information played back from an optical disk. When explanations for multiple exhibits are sequentially performed, for example, the explanation and the lighting of each exhibit may be synchronized if the explanations are recorded on an optical disk and the lighting of each exhibit is switched on the basis of the position information of the start or end position of the explanation, eliminating annoyance to visitors, unlike the prior art. Also, because the switching program pattern for switching the external device is previously stored in the pattern storing means, operation is extremely simple.

The drive switching apparatus using optical disk playback information according to the eleventh invention is configured with the drive switching apparatus using optical disk playback information according to the ninth invention, wherein a pattern storing means for storing the on/off status of the switch corresponding to predetermined position information and the position information as a switching program pattern and a comparison object selection means for selecting the registered contents of the position information register means or the stored contents of the pattern storing means are provided.

According to the eleventh invention, the on/off status of the switch corresponding to predetermined position information on the optical disk and the position information are stored as a switching program pattern by the pattern storing means. One of the pieces of position information stored as the switching program pattern, position information and position information range registered in the position information register means is selected by the comparison object selection means. The selected contents are compared by the comparison means with the position information played back from the optical disk. On the basis of this comparison result, the on/off status of the switch in the external device interface means is selectively switched by the switching control means.

With this arrangement, in addition to the above effect, the operability is further improved because the on/off status of the switch corresponding to predetermined position information on the optical disk and the position information items are stored as a switching program pattern by the pattern storing means, and any one of the pieces of position information stored as the switching program pattern, position information and position information range registered in the position information register means may be selected.

The drive switching apparatus using optical disk playback information according to the twelfth invention is configured with the drive switching apparatus using optical disk playback information according to the ninth or eleventh inventions, wherein an alarm means is provided for issuing an alarm if the unregistered area of the position information register means is equal to or less than a predetermined standard value.

According to the twelfth invention, the alarm means issues an alarm if the unregistered area of the position information register means is equal to or less than a predetermined standard value.

With this arrangement, in addition to the above effect, there is no possibility of the register area being used up before one becomes aware of it because the alarm means issues an alarm if the unregistered area of the position information register means is equal to or less than a predetermined standard value.

The drive switching apparatus using optical disk playback information according to the thirteenth invention is configured with the drive switching apparatus using optical disk playback information according to the ninth, tenth, eleventh, or twelfth inventions, wherein the switching control means selectively switches the on/off status of the switch in the external device interface means when the comparison result of the comparison means is in an identical status and the identical status continues for a predetermined time.

With the thirteenth invention, the on/off status of the switch in the external device interface means is selectively switched by the switching control means on the basis of comparison results when the comparison result of the comparison means is in an identical status and the identical status continues for a predetermined time.

With this arrangement, in addition to the above effect, when the detected position information is the same continuously for a predetermined time, the on/off status of the switch is controlled corresponding to this position information. Even if the optical disk surface is damaged or soiled and correct position information fails to be detected, no operation other than the expected operation will be performed. When track search is performed, because search playback is performed for a very short time, multiple switching operation of the switch will not be performed within this short time period, thus preventing the external device from malfunctioning.

The drive switching apparatus using optical disk playback information according to the fourteenth invention is configured with the drive switching apparatus using optical disk playback information according to the ninth, eleventh, twelfth, or thirteenth inventions. An offset setting means is provided for setting an offset value with respect to the position information or position information range registered in the position information register means and an information conversion means for offsetting the position information or position information range registered in the position information register means on the basis of the offset value are provided, the comparison means comparing the position information or position information range offset by the information conversion means with the position information input from the information input means.

According to the fourteenth invention, the position information or position information range stored in the position information storing means is offset by the information conversion means on the basis of the offset value set by the offset setting means, the offset position information or position information range being compared by the comparison means with the position information input by the information input means. On the basis of this comparison result, the on/off status of the switch in the external device interface means is selectively switched by the switching control means.

With this arrangement, in addition to the above effect, if there are multiple devices to be switched, said multiple devices may be easily switched by connecting multiple drive switching apparatuses in parallel and setting the offset value of each drive switching apparatus.

The drive switching apparatus using optical disk playback information according to the fifteenth invention is configured with the drive switching apparatus using optical disk playback information according to the ninth, tenth, eleventh, twelfth, thirteenth, or fourteenth inventions, wherein a pulse signal generating means is provided for externally outputting a predetermined pulse signal on the basis of the comparison result of the comparison means.

With the fifteenth invention, a pulse signal is externally output by the pulse signal generating means on the basis of the comparison result of the comparison means when the comparison result is in an identical status, for example.

With this arrangement, in addition to the above effect, because a pulse signal is externally output by the pulse signal generating means on the basis of the comparison result of the comparison means, it is easy to perform switching of an external device such as slide projector whose drive status may be switched by inputting a pulse signal.

BRIEF DESCRIPTION OF THE DRAWINGS

FIG. 15 is a diagram showing examples of offset in the second embodiment.

DETAILED DESCRIPTION OF THE PREFERRED EMBODIMENTS

Figure 1:
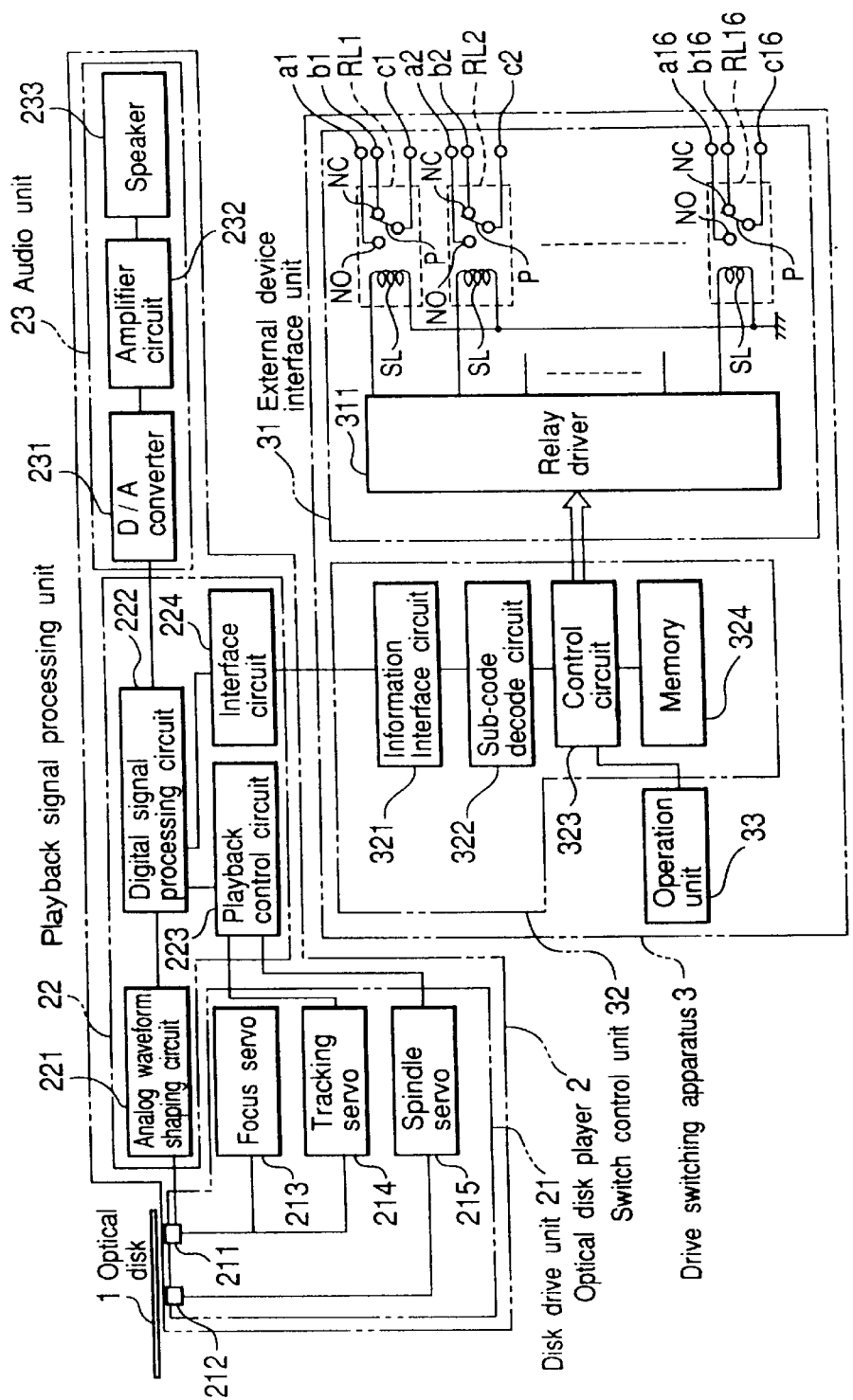
FIG. 1 is a block diagram showing the first embodiment of this invention.

FIG. 1 is a block diagram showing the first embodiment of this invention. In the figure, 1 denotes an optical disk such as compact disk, 2 denotes a general-purpose optical disk player comprising disk drive unit 21, playback signal processing unit 22, and audio unit 23. 3 denotes a drive switching apparatus comprising external device interface unit 31, switch control unit 32, and operation unit 33.

Disk drive unit 21 of optical disk player 2 comprises well known optical pick-up 211, spindle motor 212 to rotate optical disk 1, focus servo 213, tracking servo 214, spindle servo 215 to control spindle motor 212. Optical pick-up 211 is moved by focus servo 213 and tracking servo 214 to read information from optical disk 1 as an optical signal and convert it to an analog signal for output.

Playback signal processing unit 22 comprises analog waveform shaping circuit 221, digital signal processing circuit 222, playback control circuit 223, and interface circuit 224. Analog waveform shaping circuit 221 takes as input the electrical signal of playback information from optical pick-up 211 and not only shapes the waveform but also converts the wave to a digital signal for output. Digital signal processing circuit 222 takes as input the digital signal from analog waveform shaping circuit 221 to perform error check, etc., and convert it into a predetermined format and output it. Playback control circuit 223 comprising a CPU, multiple switches, etc., takes as input the playback information converted into a digital signal from digital signal processing circuit 222. It controls tracking servo 214 and spindle servo 215 on the basis of the sub-code information included in this playback information and the playback instruction information established by the switches, to playback information stored on optical disk 1. Interface circuit 224 including an optical link connector externally outputs, as an optical signal, the playback information converted into a digital signal from digital signal processing circuit 222.

Audio unit 23 comprises digital/analog (hereinafter referred to as D/A) converter 231, amplifier circuit 232, and speaker 233. D/A converter 231 converts the digital signal of the audio information format-converted by digital signal processing circuit 222 into an analog signal and outputs it to amplifier circuit 232. Amplifier circuit 232 amplifies the input signal by a predetermined factor and outputs it to speaker 233.

External device interface unit 31 of drive switching apparatus 3 comprises multiple relays RL1 to RL16 (some are omitted in the figure) and relay driver 311. The normally-open contact NO, normally-closed contact NC, and the armature P of each of the relays RL1 to RL16 are respectively connected to connection terminals a1, b1, and c1 to a16, b16, and c16 of an external device (not shown). Solenoid SL of each of relays RL1 to RL16 is grounded at one end and connected to the corresponding output terminal of relay driver 311 at the other end. Relay driver 311 includes multiple input terminals corresponding to the multiple output terminals. It supplies power to an output terminal on the basis of the input signal to the corresponding input terminal.

Switch control unit 32 comprises information interface circuit 321, sub-code decode circuit 322, control circuit 323 including a CPU, and memory 324. Memory 324 comprises rewritable non-volatile memory or battery backed-up RAMs.

Information interface circuit 321 includes the same optical link connector as described above and is connected to interface circuit 224 of optical disk player 2. It takes playback information from optical disk 1 as an optical signal. Sub-code decode circuit 322 takes the playback information of optical disk 1 from information interface circuit 321 to decode known sub-code information from this information and output it to control circuit 323. Control circuit 323 detects the switch status of operation unit 33 to be described later. It also performs predetermined indicate on the indicators and LEDs of operation unit 33 on the basis of the operation of this switch.

Control circuit 323 stores in memory 324 the track number data on the basis of the operation of the switch in operation unit 33. It also compares this registered track number or the track number set in the switching program pattern previously stored in memory 324 with the track number in the sub-code information decoded by sub-code decode circuit 322 to control each of relays RL1 to RL16 of external device interface unit 31 on the basis of the comparison result.

As the switching program pattern described above, three different patterns shown in FIGS. 2(a)–2(c) are stored, for example, in the ROM of memory 324 and may be selected by pattern selection switch 370 of operation unit 33.

Figure 2:
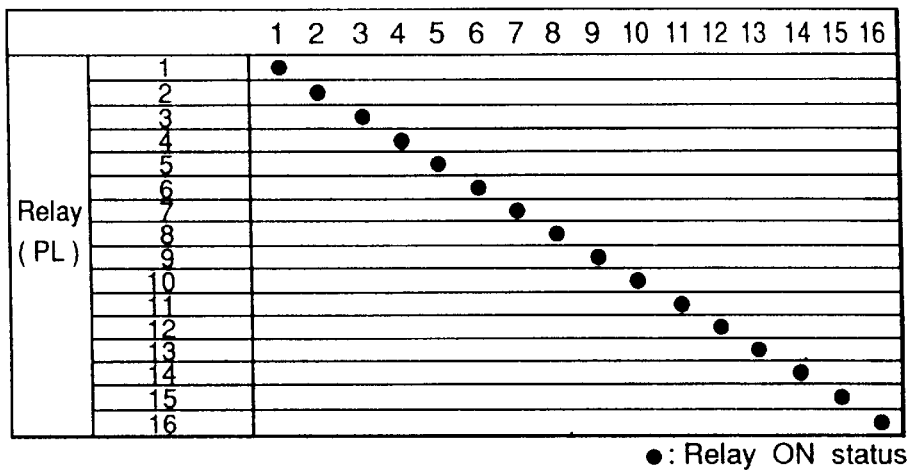
FIGS. 2(a)–2(c) (hereinafter collectively referred to as "FIG. 2") are diagrams showing the switching program pattern in the first embodiment.
Figure 2:
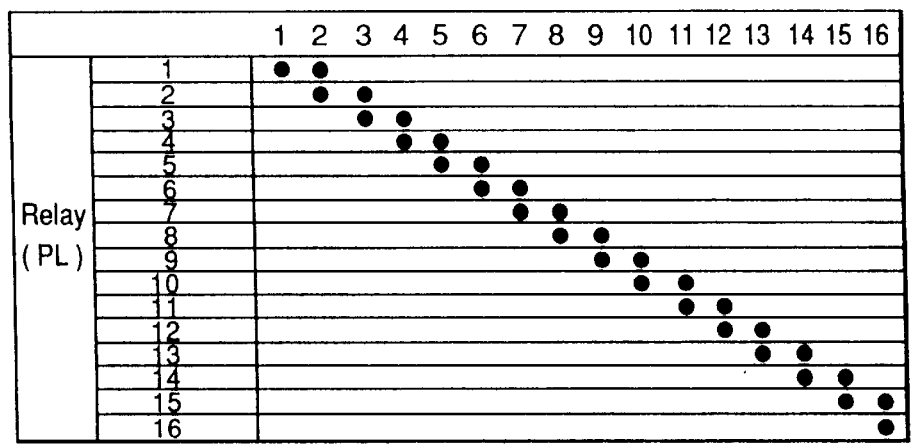
Figure 2:
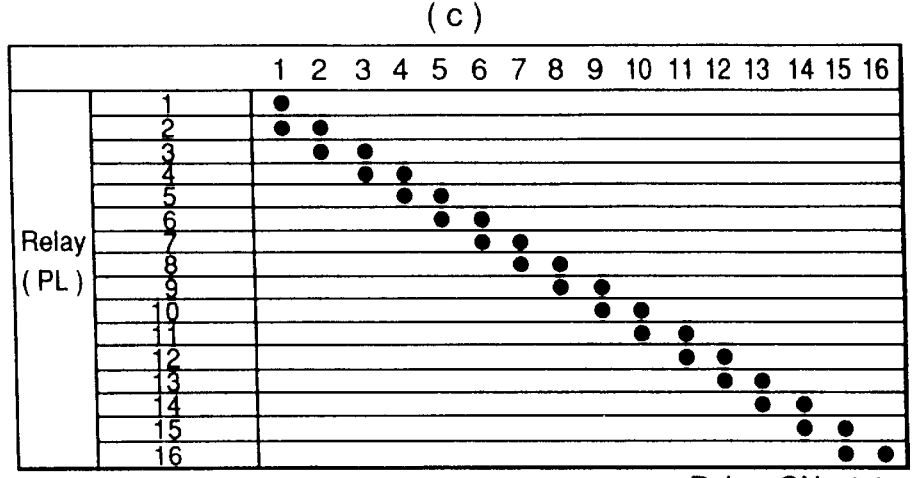

With the first switching program pattern P1 shown in FIG. 2(a), relays RL1 to RL16 of identical number to the detected track number TN are switched to the ON status. With the second switching program pattern P2 shown in FIG. 2(b), relays RL1 to RL16 of identical number to the detected track number TN and the relay having the next number are switched to the ON status. With the third switching program pattern P3 shown in FIG. 2(c), relays RL1 to RL16 of identical number to the detected track number TN and the relay having the previous number are switched to the ON status.

If the unregistered area for track numbers in memory 324 is equal to or less than a predetermined default value, control circuit 323 indicates the remaining capacity of the register area with the dots of the seven-segment indicators of operation unit 33 to be described later. In this example, the setting of the ON/OFF statuses of relays RL1 to RL16 for one track number is assumed to be one step. For example, memory 324 has a capacity to register up to 20 steps in total. If the number of unregistered steps is equal to or less than six, control circuit 323 indicates the number with the dots of the seven-segment indicators.

Figure 3:
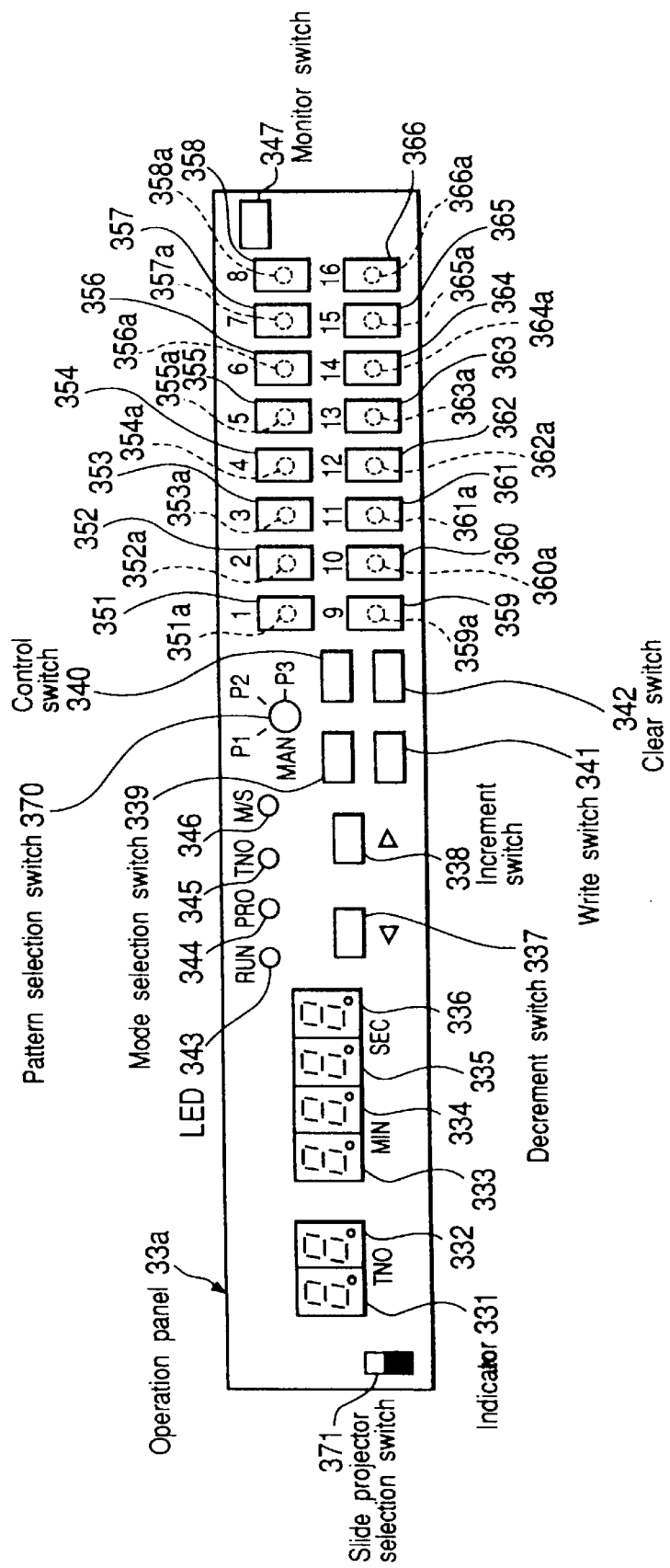
FIG. 3 is a diagram showing the operation panel of the first embodiment.

As FIG. 3 shows, operation unit 33 comprises seven-segment indicators with dots 331 to 336, decrement switch 337, increment switch 338, mode selection switch 339, control switch 340, write switch 341, clear switch 342, LEDs 343 to 346, monitor switch 347, relay operation setting switches 351 to 366, pattern selection switch 370 and slide projector selection switch 371 (alternate switch), which are arranged on operation panel 33a. Replay operation setting switches 351 to 366 respectively incorporate LEDs 351a to 366a.

The operation of the first embodiment having the above-mentioned configuration is described below.

First, as an example, let us consider how to explain multiple exhibits in a predetermined order as described in the description of the prior art.

First, optical disk 1 capable of recording, for example, additionally writable and rewritable compact disks and a recording apparatus for recording on said optical disk 1 are prepared and explanations for respective exhibits are recorded sequentially in a predetermined order on optical disk 1. At this time, the recording start position of the description for each exhibit is noted with track number TN or absolute time T of optical disk 1. Here, absolute time T refers to the absolute time code in the sub-code information played back from optical disk 1, for example.

Figure 4:
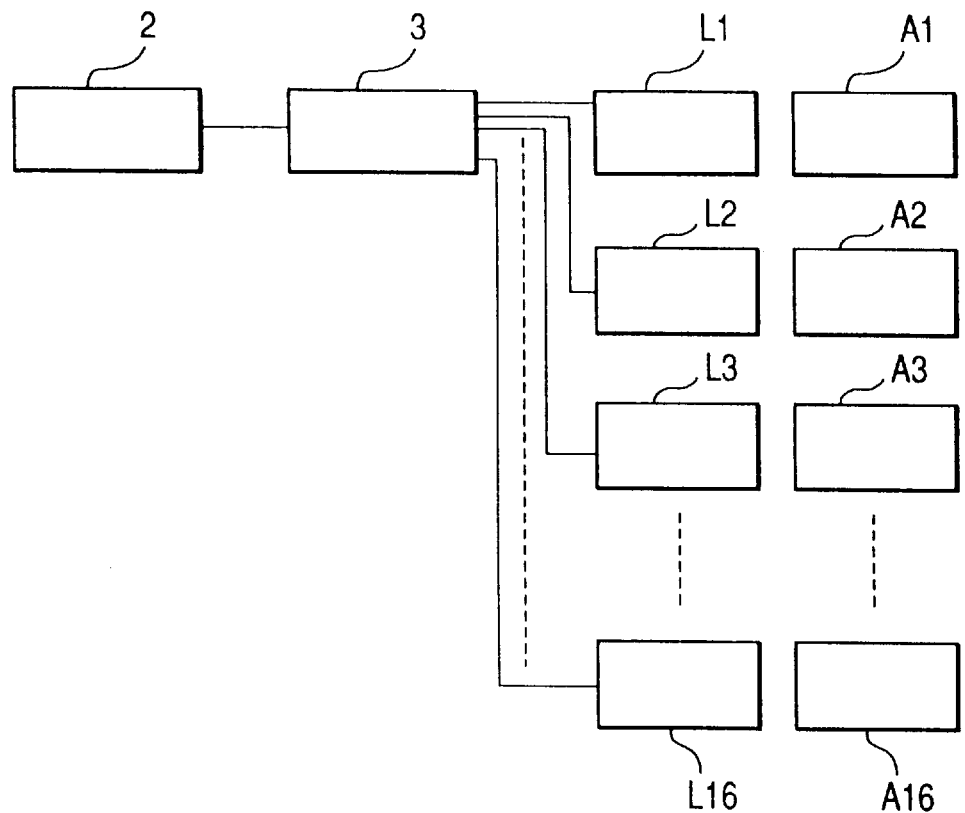
FIG. 4 is a diagram describing the operation of the first embodiment.

In the exhibit hall, optical disk player 2 and drive switching apparatus 3 are connected as described above. Also, the power supply lines for spotlights L1 to L16 corresponding to respective exhibits A1 to A16 are connected to respective relays RL1 to RL16 of external device interface unit 31 as shown in FIG. 4, so that when relays RL1 to RL16 are turned ON, spotlights L1 to L16 corresponding to relays RL1 to RL16 are turned ON. The playback order of the explanations recorded on optical disk 1 is set in playback control unit 223 of optical disk player 2. By means of operation unit 33 of drive switching apparatus 3, track numbers TN1a and TN1b to TN16a to TN16b or absolute times T1a and T1b to T16a and T16b corresponding to the start and end positions of explanations for respective exhibits on optical disk 1 are registered. The switching statuses in which relays RL1 to RL16 should be when track number TN or absolute time T on optical disk 1 are within one of the ranges from the start and end positions specified by track numbers TN1a and TN1b to TN16a and TN16b or absolute times T1a and T1b to T16a and T16b, or are identical to a start or end position, are also registered. The setting method using track numbers is described below. Setting with absolute time may be performed in the same manner.

To register the above-mentioned track numbers TN1a and TN1b to TN16a and TN16b and the switching statuses of relays RL1 to RL16, mode selection switch 339 is pressed to put the system into the programmable status in which LED 344 lights up and control switch 340 is pressed to allow setting with track numbers. Pressing control switch 340 toggles between setting with track numbers and setting with absolute time. When the system is in the status of setting with track numbers, LED 345 is ON and when in the status of setting with absolute time, LED 346 is ON.

When LED 345 is turned ON by pressing control switch 340, increment switch 338 or decrement switch 337 is used to select track number TN1a and TN1b to TN16a and TN16b corresponding to the switching positions of relays RL1 to R116. The selected track number is indicated on indicators 331 and 332. In the case of setting with absolute time, the absolute time is indicated on indicators 333 to 336. Then, still in this status, the switching statuses of relays RL1 to RL16 are set by pressing relay operation setting switches 351 to 366.

When relay operation setting switches 351 to 366 are pressed, LEDs 351a to 366a in relay operation setting switches 351 to 366 are turned ON or OFF accordingly. When LEDs 351a to 366a are turned ON, this indicates that corresponding relays RL1 to RL16 will operate. After the operating statuses of relays RL1 to RL16 are set with relay operation setting switches 351 to 366, pressing light switch 341 causes the operating statuses of relays RL1 to RL16 corresponding to the track number indicated on indicators 331 and 332 to be stored in memory 324. For a track number(s) between track number TNa registered as the operation start position and track number TNb registered as the operation end position of one relay RL1 to RL16, relay ON status is assumed. The above operation is repeated as many times as necessary.

Figure 5:
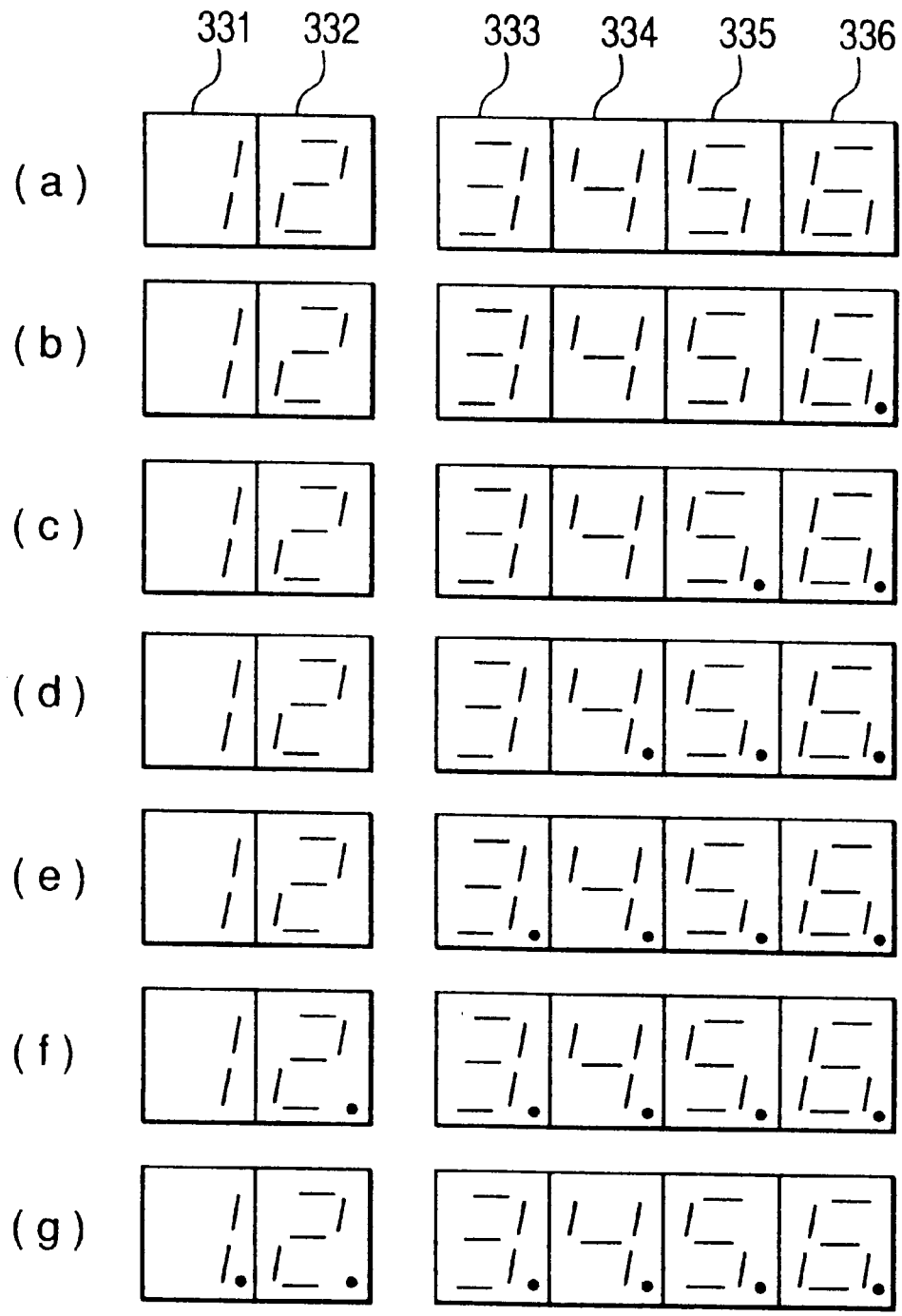
FIGS. 5(a)–5(g) (hereinafter collectively referred to as "FIG. 5") are diagrams showing examples of display of the remaining capacity of the memory of the first embodiment.

During this setting operation, if the unregistered area of memory 324 is equal to or less than six steps, the number of unregistered steps is indicated with the dots of indicators 331 to 336 as shown in FIG. 5, as described above. FIG. 5(a) shows that the number of unregistered steps is equal to or more than six. In FIG. 5(b), the dot of display 336 is turned ON to indicate that the number of unregistered steps is five. In FIGS. 5(c) to (g), the dots of indicators 331 to 335 are turned ON to indicate that the number of unregistered steps is four to zero, respectively.

In the case of an input error, pressing clear switch 342 deletes the specified track number and the corresponding relay setting from memory 324. To confirm the programmed contents recorded in memory 324, turning monitor switch 347 ON and pressing increment switch 338 or decrement switch 337 causes a track number or absolute time to be indicated on indicators 331 to 336. This also causes the statuses of relays RL1 to RL16 corresponding to this track number or absolute time to be indicated on LEDs 351a to 366a of relay operation setting switches 351 to 366.

In this example, because explanations for exhibits A1 to A16 are sequentially performed as described above, the switching statuses of relays RL1 to RL16 are set so that they are turned ON according to track numbers TN1a to TN16a, respectively, to selectively illuminate exhibits A1 to A16 to be explained. The above operation completes manual setting of relay switching statuses.

On the other hand, to perform setting of relay switching statuses with a switching program pattern, the playback order of the explanations recorded on optical disk 1 is set in playback control circuit 223 of optical disk player 2 and then a desired switching program pattern P1 to P3 is selected with pattern selection switch 370. In this example, because explanations are sequentially performed by illuminating exhibits A1 to A16 corresponding to track number TN, all that is necessary is to set pattern selection switch 370 to the P1 position to select the above-mentioned first switching program pattern P1. This allows setting of relay switching statuses to be completed very easily.

With such a setting, when explanations for respective exhibits recorded on optical disk 1 are playbacked after mode selection switch 339 is pressed to turn LED 343 ON which indicates the operation status, the explanations for exhibits A1 to A16 that are played back by disk drive unit 21 and playback signal processing unit 22 are output in audio form from speaker 233 by audio unit 23. When the explanation for the first exhibit A1 is started, track number TN of optical disk 1 is equal to the previously registered track number TN1a. At this time, relay RL1 is turned ON and light L1 is turned ON to illuminate only the first exhibit A1. While the explanation for the first exhibit A1 is in progress, light L1 is kept ON. When the explanation for the first exhibit A1 ends and track number TN of optical disk 1 is equal to track number TN1b which indicates the operation end position of relay RL1, relay RL1 is set to the OFF status and light L1 is turned OFF.

Even if the track number TN1a data is not input from optical disk player 2 to drive switching apparatus 3 due to some external effect, if track number TN subsequently input from optical disk player 2 to drive switching apparatus 3 is within the range from track numbers TN1a to TN1b, relay RL1 is turned ON and light L1 is turned ON. This enables a spotlight to be turned ON even if the start position of the light fails to be detected due to some error, for example, because the position on optical disk 1 that corresponds to track number TN1a is soiled or damaged, thus eliminating annoyance to visitors, unlike the prior art.

Next, when the explanation for the second exhibit A2 is started, that is, when track number TN is equal to the registered track number TN2a, relay RL2 is turned ON. This turns light L2 ON to illuminate only the second exhibit A2 to be explained. Afterwards, relays RL3 to RL16 are switched in the same manner to selectively illuminate exhibits A3 to A16 in synchronization with the explanations.

Next, as an example, let us consider how to automatically feed slides in a slide projector, one slide at a time, in parallel with an audio explanation.

In this case, explanations for respective slides are previously recorded in a predetermined order in the same manner as in the previous example. At this time, the recording start positions of the explanations for respective slides are noted with the absolute time of optical disk 1. If no explanations are recorded, the display time of each slide is previously determined.

Then, optical disk player 2 and drive switching apparatus 3 are connected as described above and the armature and normally-open contact of any one of relays RL1 to RL16 are connected in parallel with the slide feed switch of the slide projector. In this example, relay RL1 is used to perform slide feed.

If slide feed is performed with the reproduction of the explanations, the playback order of the explanations recorded on optical disk 1 is set in playback control circuit 223 of optical disk player 2. Also, absolute times T1 to Tn corresponding to the start positions of the explanations for respective slides on optical disk 1 and the switching statuses in which relays RL1 to RL16 (only relay RL1 is driven in this example) should be when absolute time T played back from optical disk 1 is identical to absolute time T1 to Tn are registered by means of operation panel 33a of drive switching apparatus 3.

If slide explanation is performed manually or no explanation is given, the system is set to reproduce optical disk 1 sequentially from the beginning. Also, absolute times T1 to Tn at which slide feed is performed on the basis of the previously determined display time of each slide and the switching statuses in which relays RL1 to RL16 (only relay RL1 is driven in this example) should be when absolute time T played back from optical disk 1 is identical to absolute time T1 to Tn are registered. The registration method is the same as described above.

Figure 6:
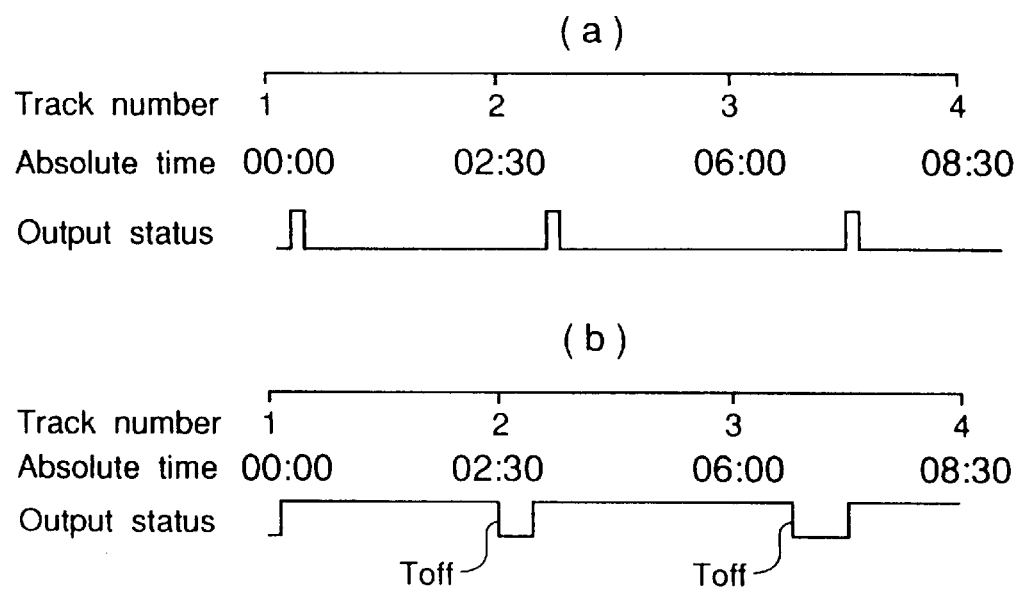
FIGS. 6(a) and 6(b) (hereinafter collectively referred to as "FIG. 6") are diagrams describing the operation of the first embodiment.
Figure 7:
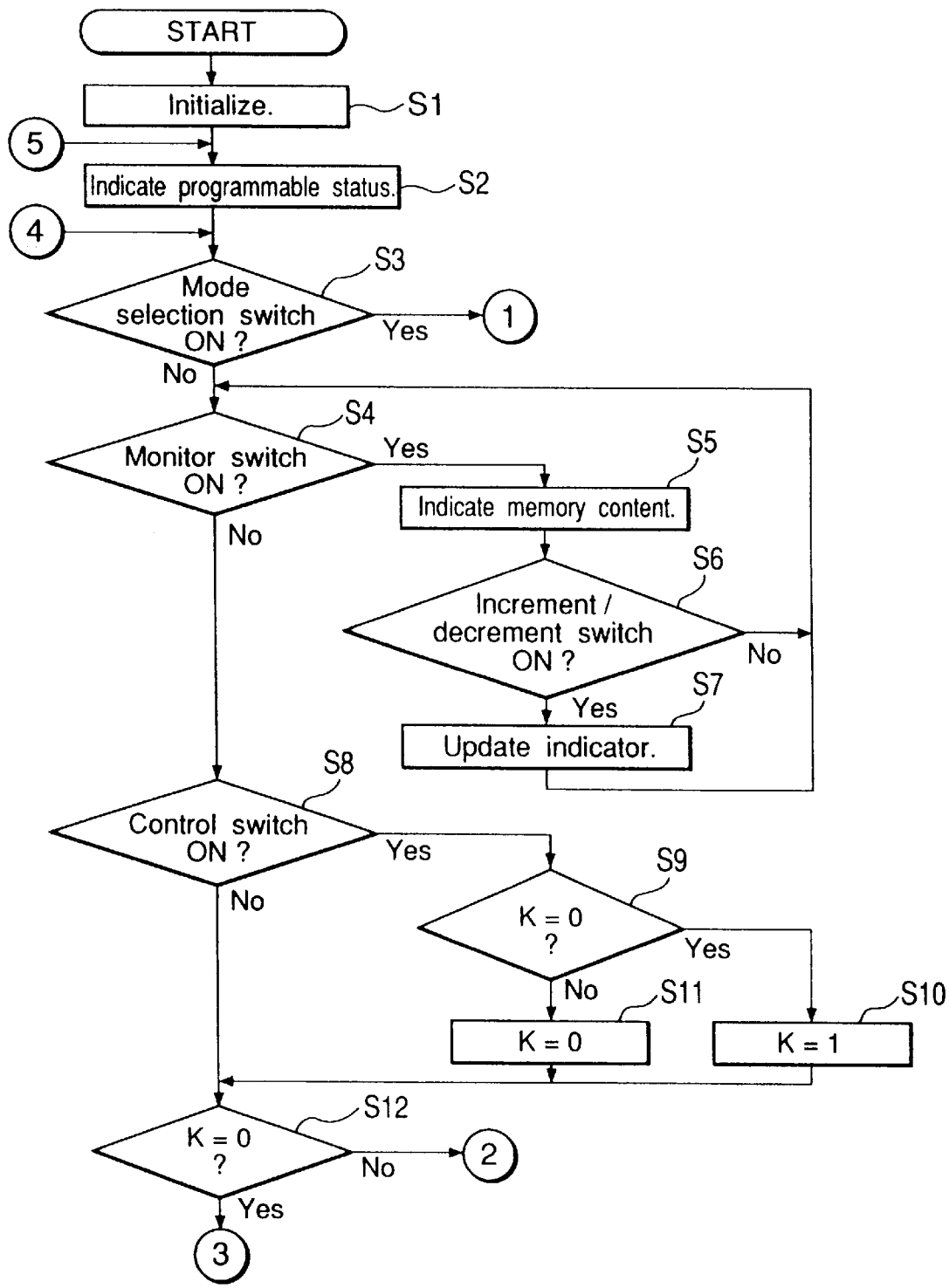
FIG. 7 is a control flow chart showing the main control portion of the first embodiment.
Figure 8:
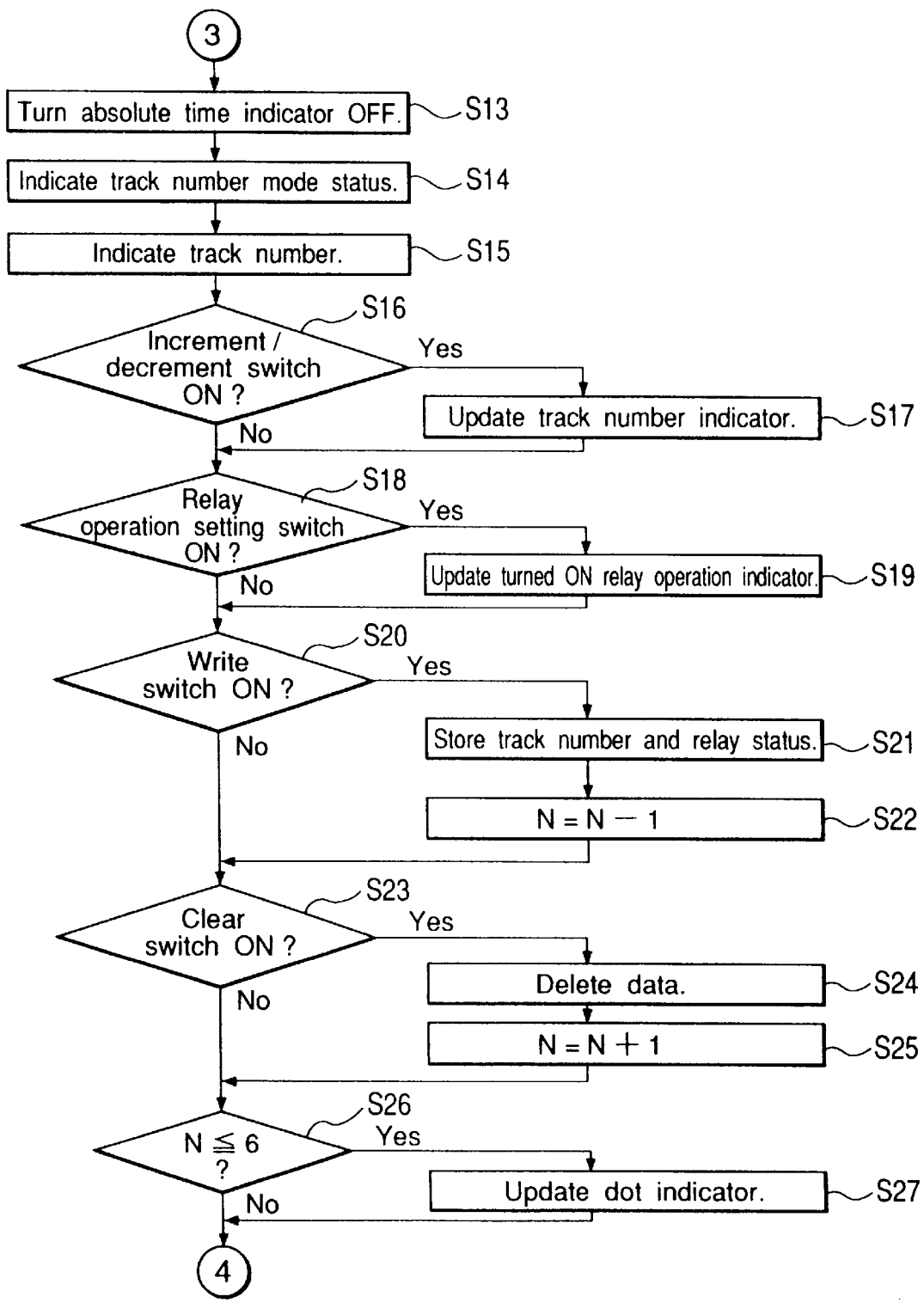
FIG. 8 is a control flow chart showing the main control portion of the first embodiment.
Figure 9:
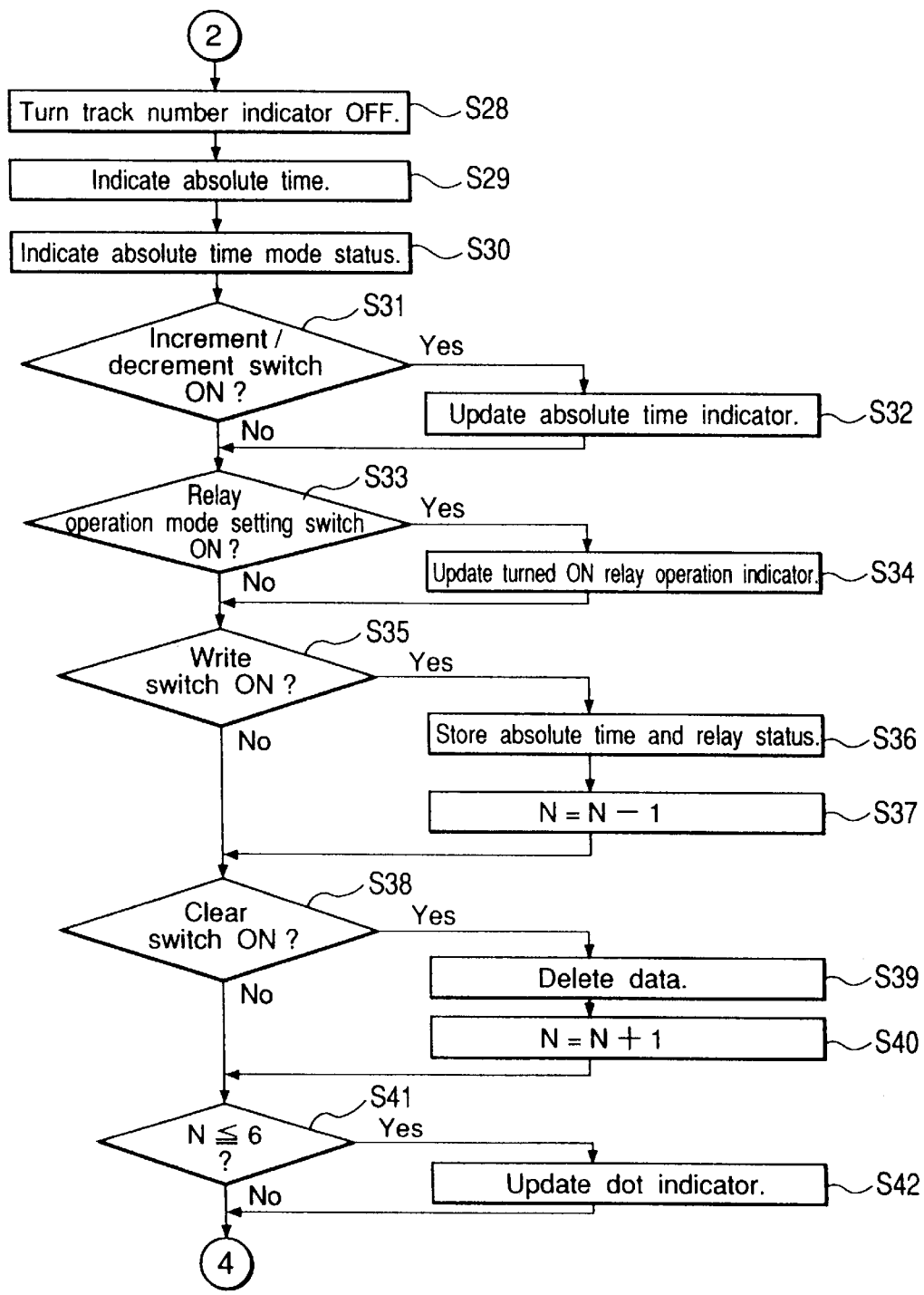
FIG. 9 is a control flow chart showing the main control portion of the first embodiment.
Figure 10:
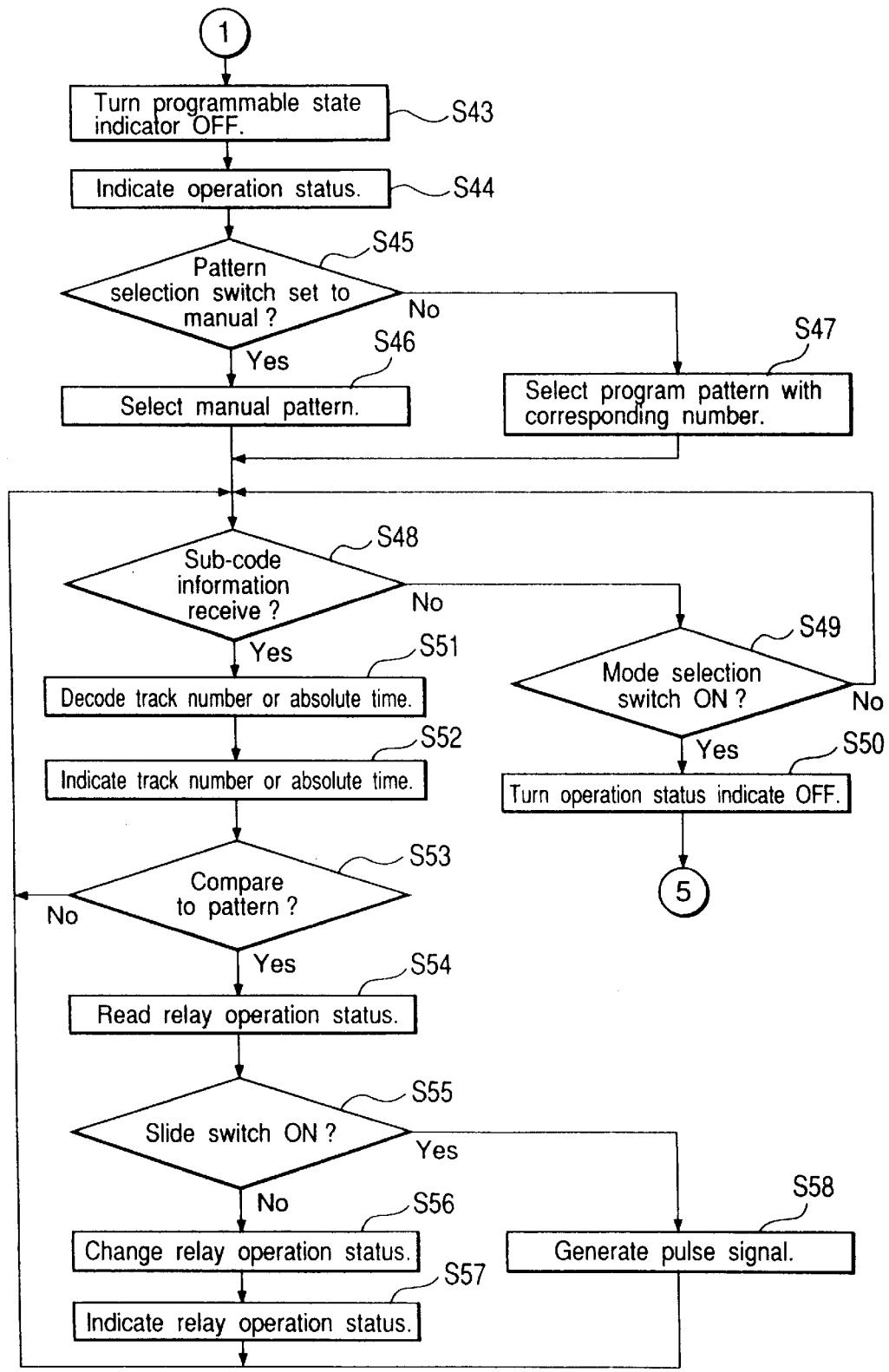
FIG. 10 is a control flow chart showing the main control portion of the first embodiment.
Figure 11:
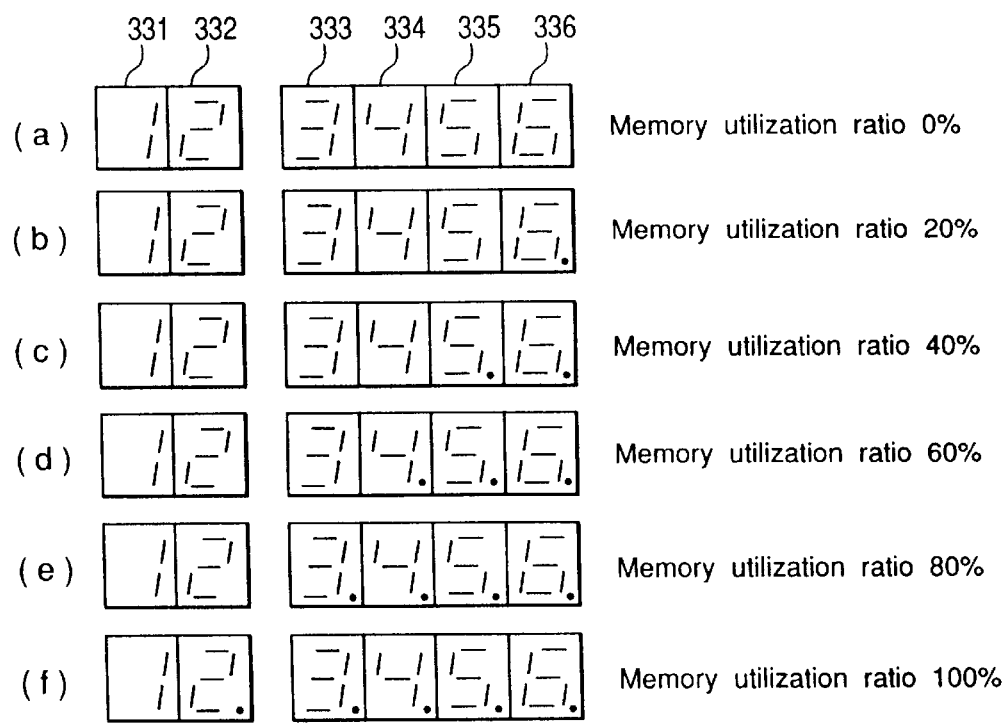
FIGS. 11(a)–11(f) (hereinafter collectively referred to as "FIG. 11") are diagrams showing examples of display of the remaining capacity of the memory of the first embodiment.

In this example, because slide feed for a slide projector is sequentially performed as described above, slide projector selection switch 371 is set to ON. With this setting, when the absolute time of an information played back position on optical disk 1 is identical to registered absolute time T1 to Tn, relay RL1 is turned ON for a predetermined time and a pulse signal is externally output, as shown in FIG. 6(a). If slide projector selection switch 371 is set to OFF, the relay is kept ON until absolute time Toff where relay OFF is set, as shown in FIG. 6(b).

With such a setting, when optical disk 1 on which explanations for respective slides are recorded is played back, the explanations for the slides that are played back by disk drive unit 21 and playback signal processing unit 22 are output in audio form from speaker 233 by audio unit 23. When the explanation for the first slide is started, absolute time T of optical disk 1 is equal to the previously-registered absolute time T1. At this time, relay RL1 is turned ON for a predetermined time, a pulse signal is output and slide feed is performed to display the first slide.

When the explanation for the first slide ends and the explanation for the second slide begins, that is, when absolute time T is equal to absolute time T2 registered in memory 324, relay RL1 is turned ON again for a predetermined time and a pulse signal is output. This causes slide feed and the second slide is indicated. Afterwards, when the descriptions for the third and fourth slides are started, relay RL1 is instantaneously switched in the same manner and slide feed is performed in synchronization with the explanations to display the slides to be explained.

Next, the operation of switch control unit 32 is described in detail referring to the control flowcharts in FIGS. 7 to 10.

The CPU in control circuit 323 sets the variable N to 20, the maximum registerable step number of memory 324, and the variable K to 0, by way of initialization (S1). It turns LED 344 ON to indicate the programmable status (S2) and judges whether mode selection switch 339 is turned ON (S3). As a result of this judgment, if mode selection switch 339 is turned ON, it goes to process S43 to be described later. Otherwise, the CPU judges whether monitor switch 347 is ON (S4). As a result of this judgment, if monitor switch 347 is ON, one registered content of memory 324 is indicated (S5). The CPU then judges whether increment switch 338 or decrement switch 337 is turned ON (S6). As a result of this judgment, if increment switch 338 or decrement switch 337 is not tuned ON, it goes to process S4, otherwise it updates the indication of memory content (S7) and goes to process S4.

As a result of judgment of S4, if monitor switch 347 is OFF, the CPU in control circuit 323 judges whether control switch 340 is turned ON (S8). If it is turned ON, the CPU judges whether the variable K is 0 (S9). If it is 0, the CPU sets the variable K to 1 (S10). Otherwise, it sets the variable K to 0 (S11). Then, it judges whether the variable K is 0 (S12). If it is not 0, the CPU goes to process S28 to be described later. If the variable K is 0, it turns OFF the absolute time displays on indicators 333 to 336 (S13) and turns ON LED 345 to indicate the track number specification status (S14). The CPU indicates a track number on indicators 331 and 332 (S15) and judges whether increment switch 338 or decrement switch 337 is turned ON (S16). As a result of this judgment, if increment switch 338 or decrement switch 337 is turned ON, it updates the track number displays on indicators 331 and 332 (S17). Then, the CPU judges whether relay operation setting switches 351 to 366 are turned ON (S18) and, if ON, turns ON LEDs 351a to 366a of relay operation setting switches 351 to 366 which are turned ON (S19).

Next, the CPU in control circuit 323 judges whether light switch 341 is turned ON (S20). If it is turned ON, the CPU stores in memory 324 the relay operation status corresponding to the track numbers indicated on indicators 331 and 332 (S21) and subtracts one from the variable N (S22). Then, the CPU judges whether clear switch 342 is turned ON (S23). If it is turned ON, the CPU deletes the track numbers from indicators 331 and 332 and the corresponding relay operation status from memory 324 (S24) and adds one to the variable N (S25). Then, the CPU judges whether the variable N is equal to or less than 6 (S26). If it is, the CPU updates the dot ON status of indicators 331 to 336 in accordance with the value of the variable N (S27). Then, the CPU goes to process S3.

As a result of judgment of S9, if control switch 340 is turned ON, the CPU in control circuit 323 enters the setting process with absolute time. This means that the CPU in control circuit 323 turns the track number display OFF on indicators 331 and 332 (S28) and indicates the absolute time on indicators 333 to 336 (S29) and turns LED 346 ON to indicate the program input status with absolute time (S30). Then, it judges whether increment switch 338 or decrement switch 337 is turned ON (S31). As a result of this judgment, if increment switch 338 or decrement switch 337 is turned ON, the CPU updates the absolute time display on indicators 333 to 336 (S32). Then, the CPU judges whether relay operation setting switches 351 to 366 are turned ON (S33) and, if ON, turns ON LEDs 351a to 366a of relay operation setting switches 351 to 366 which are turned ON (S34).

Next, the CPU in control circuit 323 judges whether write switch 341 is turned ON (S35). If light switch 341 is turned ON, the CPU stores in memory 324 the relay operation status corresponding to the track number indicated on indicators 333 to 336 (S36) and subtracts one from the variable N (S37). Then, the CPU judges whether clear switch 342 is turned ON (S38). If ON, the CPU deletes the absolute time from indicators 333 to 336 and the corresponding relay operation status from memory 324 (S39) and adds one to the variable N (S40). Then, the CPU judges whether the variable N is equal to or less than 6 (S41). If it is, the CPU updates the dot ON status of indicators 331 to 336 in accordance with the value of the variable N (S42). Then, the CPU goes to process S3.

As a result of judgment of S3, if mode selection switch 339 is turned ON, the CPU in control circuit 323 turns LEDs 344 to 346 OFF (S43) and turns LED 343 ON to indicate the operation status (S44). Then, the CPU judges whether pattern selection switch 370 is set to the manual (MAN) position (S45). If it is, the CPU selects the manual pattern set by processes S4 to S27 (S46). If pattern selection switch 370 is not set to the manual (MAN) position, the CPU selects switching program patterns P1 to P3 corresponding to the setting of pattern selection switch 370 (S47).

Then, the CPU in control circuit 323 judges whether sub-code information is input from sub-code decode circuit 322 (S48). As a result of this judgment, if no sub-code information is input, the CPU judges whether mode selection switch 339 is turned ON (S49). If the mode selection switch is turned ON, the CPU turns LED 343 OFF (S50) and goes to process S2. If mode selection switch 339 is not turned ON, the CPU goes to process S48.

As a result of judgment of S48, if sub-code information is input, the CPU detects track number TN and absolute time T from the sub-code information (S51) and indicates track number TN or absolute time T on indicators 331 to 336 (S52). The CPU judges whether track number TN or absolute time T is set in the previously-selected manual pattern or switching program pattern (S53). As a result of this judgment, if track number TN or absolute time T is not set in the manual pattern or switching program pattern, the CPU goes to process S48 and if track number TN or absolute time T is set in the manual pattern or switching program pattern, the CPU reads the operation setting statuses of relays RL1 and RL16 corresponding to track number TN or absolute time T from the set values in the manual pattern or switching program pattern (S54). The CPU judges whether slide projector selection switch 371 is turned ON (S55).

As a result of this judgment, if slide projector selection switch 371 is OFF, the CPU switches the operation statuses of relays RL1 to RL16 on the basis of the operation setting statuses which were read out (S56) and indicates the operation statuses of relays RL1 to RL16 on LEDs 351a to 366a (S57). Then, the CPU goes to process S48. If slide projector selection switch 371 is ON, the CPU instantaneously switches the operation statuses of relays RL1 to RL16 on the basis of the operation setting statuses which were read out, and generates a pulse signal (S58), and goes to process S48.

According to this embodiment, not only the explanations for exhibits A1 to A16 may be sequentially performed by using a single optical disk player 2, but also the ON statuses of respective spotlights L1 to L16 may be switched in synchronization with the explanations for exhibits A1 to A16, as described above. In addition, the slides to be projected according to the explanations may be fed automatically and sequentially, thereby greatly reducing the amount of work required by the operator. Because a well-known disk player 2 may be used, any information-recording position may be accessed instantaneously, eliminating the possibility of the start position not coinciding with the light. If the unregistered area of memory 324 is equal to or less than 6 steps, the number of unregistered steps is indicated with the dots of indicators 331 to 336, eliminating the possibility of the register area of memory 324 being used up before one knows it, thereby improving operability.

Because the number of unregistered steps in memory 324 is indicated by using the dots of the seven-segment indicators 331 to 336 for displaying a track number and absolute time, there is no need to install an infrequently-used new display to indicate the remaining capacity, thereby reducing both cost and power consumption. Also, because a general-purpose optical disk player 2 may be employed, the CPU capabilities incorporated into optical disk player 2 such as remote control, random play, and program play may also be used.

It should be noted that although this embodiment is configured so that if the unregistered area of memory 324 is equal to or less than 6 steps, the number of unregistered steps is indicated with the dots of indicators 331 to 336, this invention is not limited to this alone. For example, another display may be used. Alternatively, the percentage of used status of memory 324 may be indicated with the dots of the seven-segment indicators as shown in FIGS. 11(a)–11(f) to achieve almost the same effect. It is also possible to obtain the same effect by notifying the operator by a buzzer sound or flashing lamp when the unregistered area of memory 324 is equal to or less than a predetermined value.

It should be noted that although this embodiment is configured so that sixteen relays RL1 to RL16 are mounted in external device interface unit 31 to control lights L1 to L16, this invention is not limited to this alone. The number of relays may be increased or decreased any time and various devices other than lights L1 to L16 may be controlled. In addition, a means other than a relay may also be used as an interface for controlling an external device. For example, a circuit may be mounted which outputs a control signal to control an external device on the basis of the signal from control circuit 323.

Selection switches may be mounted for respective relays RL1 to RL16 to accommodate a slide projector. Devices to be switched are not limited to lights and a slide projector, but may be other devices and illumination.

Needless to say, although this embodiment is configured so that a drive switching apparatus 3 is provided independently of optical disk player 2, a drive switching apparatus integrating them both may also be configured to achieve the same effect.

Next, the second embodiment of this invention is described below.

Figure 12:
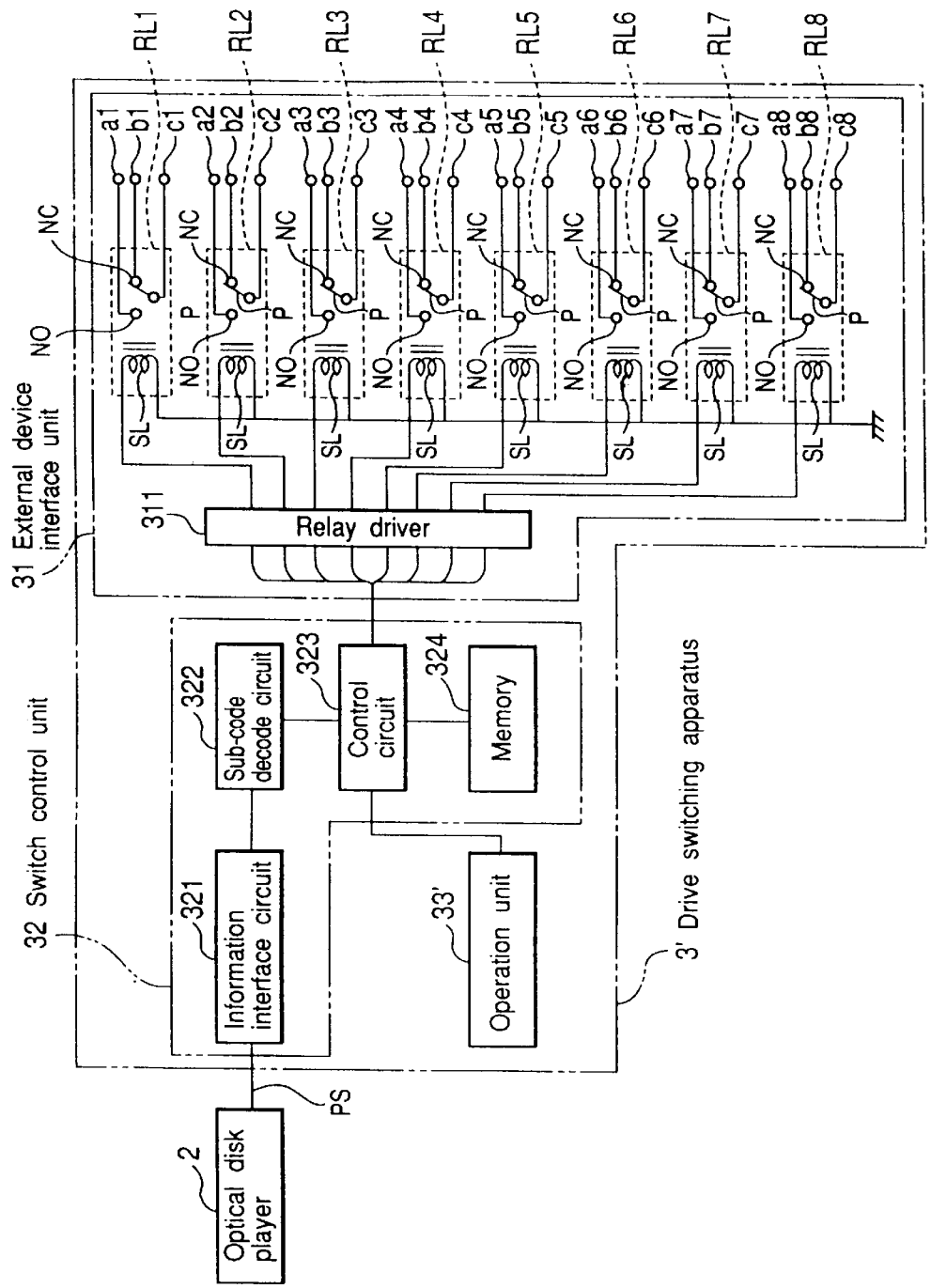
FIG. 12 is a block diagram showing the second embodiment of this invention.

FIG. 12 is a diagram showing the configuration of drive switching apparatus 3' according to the second embodiment. In the figure, the same components as in the first embodiment are represented by the same symbols whereby their descriptions are omitted. The differences between the first and second embodiments are that in the second embodiment, the number of relays in external device interface unit 31 is eight and a reference track number for operating relays RL1 to RL8 is set and the reference track number for operating relays RL1 to RL8 may be varied by giving an offset to this reference track number and that operation unit 33' is provided instead of operation unit 33 of the first embodiment.

Figure 13:
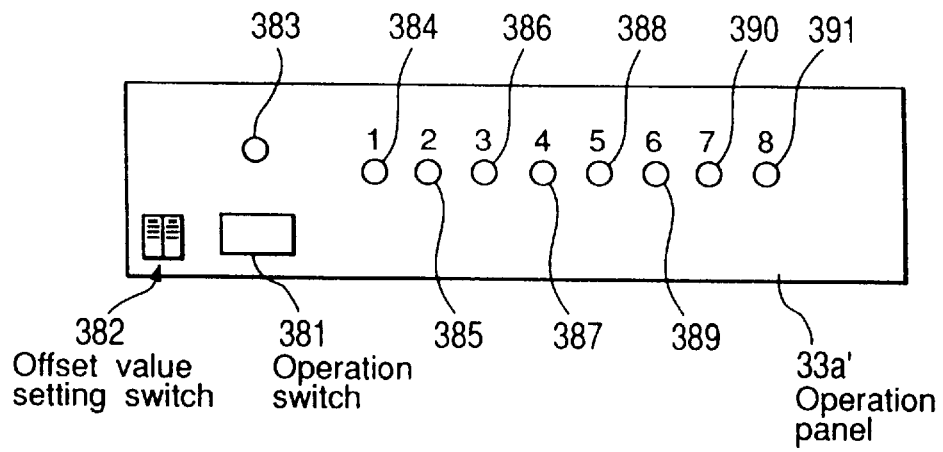
FIG. 13 is a diagram showing the operation panel of the second embodiment.

As FIG. 13 shows, operation unit 33' comprises operation switch 381, offset value setting switch 382, operation display LED 383 to indicate the operation status, relay operation display LEDs 384 to 391 to indicate the operation statuses of relays RL1 to RL8 according to relays RL1 to RL8, which are arranged on operation panel 33a'. Offset value setting switch 382 comprises two slide-type alternate switches to allow setting of the values 0 to 3 in binary form.

Control circuit 323 detects the switching status of operation unit 33' and turns ON each LED of operation unit 33' on the basis of the operation of this switch. Control circuit 323 also controls relays RL1 to RL8 of external device interface unit 31 on the basis of the offset value set by the offset value setting switch of operation unit 33' and the track number in the sub-code information decoded by sub-code decode circuit 322. 1 to 8, for example, is set in control circuit 323 as reference track numbers. When the offset value set by offset value setting switch 382 is 0, if the track number input from sub-code decode circuit 322 is identical to the reference track number, that is, if track number TN input from sub-code decode circuit 322 is 1 to 8, relays RL1 to RL8 are controlled accordingly. When a value other than 0 is set as the offset value, if the track number, which is the reference track number plus eight times the switch set value, is identical to the track number input from sub-code decode circuit 322, relays RL1 to RL8 are controlled accordingly.

If the track number in the decoded sub-code information is the same for a predetermined time, for 20 frames, for example, control circuit 323 controls relays RL1 to RL8 according to this track number. As is well known, a compact disk contains 75 frames per second and each frame contains sub-code information. Because the absolute time is in seconds, the same absolute time information continues for 75 frames. Also, the track numbers in the sub-code information of respective frames in the same information are the same. Consequently, the time required to detect that the track number or absolute time remains the same for 20 frames is about 0.3 second, which is short enough to perform switching with little trouble. Also, even if the optical disk surface is damaged or soiled and correct sub-code information fails to be detected, no operation other than expected operation will be performed. When track search is performed, because sub-code information played back for the search is only for a few frames, switching operation will not be performed many times in a short time, unlike the prior art.

The operation of this embodiment having the above-mentioned configuration is described below, using as an example the explanation of multiple exhibits in a predetermined order.

First, an optical disk capable of recording and a recording apparatus for recording on said optical disk are prepared and explanations for respective exhibits are recorded sequentially in a predetermined order on the optical disk. At this time, the recording start position of the description for each exhibit is noted with track number TN of the optical disk.

Figure 14:
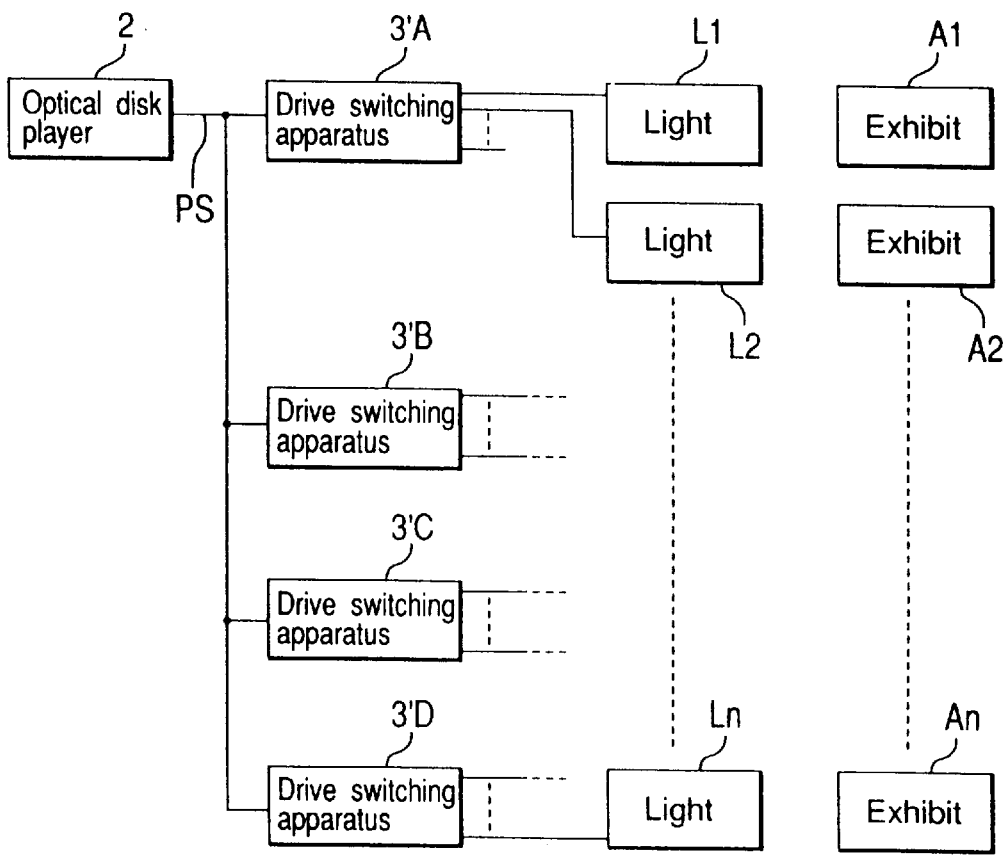
FIG. 14 is a diagram describing the operation of the second embodiment.

As FIG. 14 shows, if there are multiple exhibits in the exhibit hall, optical signal PS output from optical disk player 2 is connected so that it is input to multiple drive switching apparatuses 3'A to 3'D and the power supply lines for spotlights L1 to Ln corresponding to respective exhibits A1 to An are connected to respective relays RL1 to RL8 of external device interface unit 31 so that when relays RL1 to RL8 are turned ON, spotlights L1 to Ln corresponding to relays RL1 to RL8 are turned ON. The playback order of the explanations recorded on the optical disk is set in optical disk player 2. The offset values for drive switching apparatuses 3'A to 3'D are set. In this example, the offset value for drive switching apparatus 3'A is set to 0 and the offset values for drive switching apparatuses 3'B to 3'D are set to 1, 2, and 3, respectively.

With this arrangement, as FIG. 15 shows, if drive switching apparatus 3'A detects a track number 1 to 8, relay RL1 to RL8 is set to ON accordingly, if drive switching apparatus 3'B detects a track number 9 to 16, relay RL1 to RL8 is set to ON accordingly, if drive switching apparatus 3'C detects a track number 17 to 24, relay RL1 to RL8 is set to ON accordingly, and if drive switching apparatus 3'D detects a track number 25 to 32, relay RL1 to RL8 is set to ON accordingly.

With such a setting, when the optical disk on which the explanations for respective exhibits are recorded is played back by optical disk player 2, the explanations for exhibits A1 to An are output in audio form from speakers (not shown). When the explanation for the first exhibit A1 is started, track number TN of the optical disk becomes 1, and relay RL1 of drive switching apparatus 3'A is turned ON and light L1 is turned ON to illuminate only the first exhibit A1. While the explanation for the first exhibit A1 is in progress, light L1 is kept ON. When the explanation for the first exhibit A1 ends and that for the second exhibit A2 begins, that is, when track number TN becomes 2, relay RL1 of drive switching apparatus 3'A is turned OFF and relay RL2 is turned ON. This turns light L1 OFF and turns light L2 ON to illuminate only the second exhibit A2. Afterwards, relays RL1 to RL8 of each of drive switching apparatuses 3'A to 3'D are switched in the same manner to selectively illuminate exhibits A3 to An to be explained.

Figure 16:
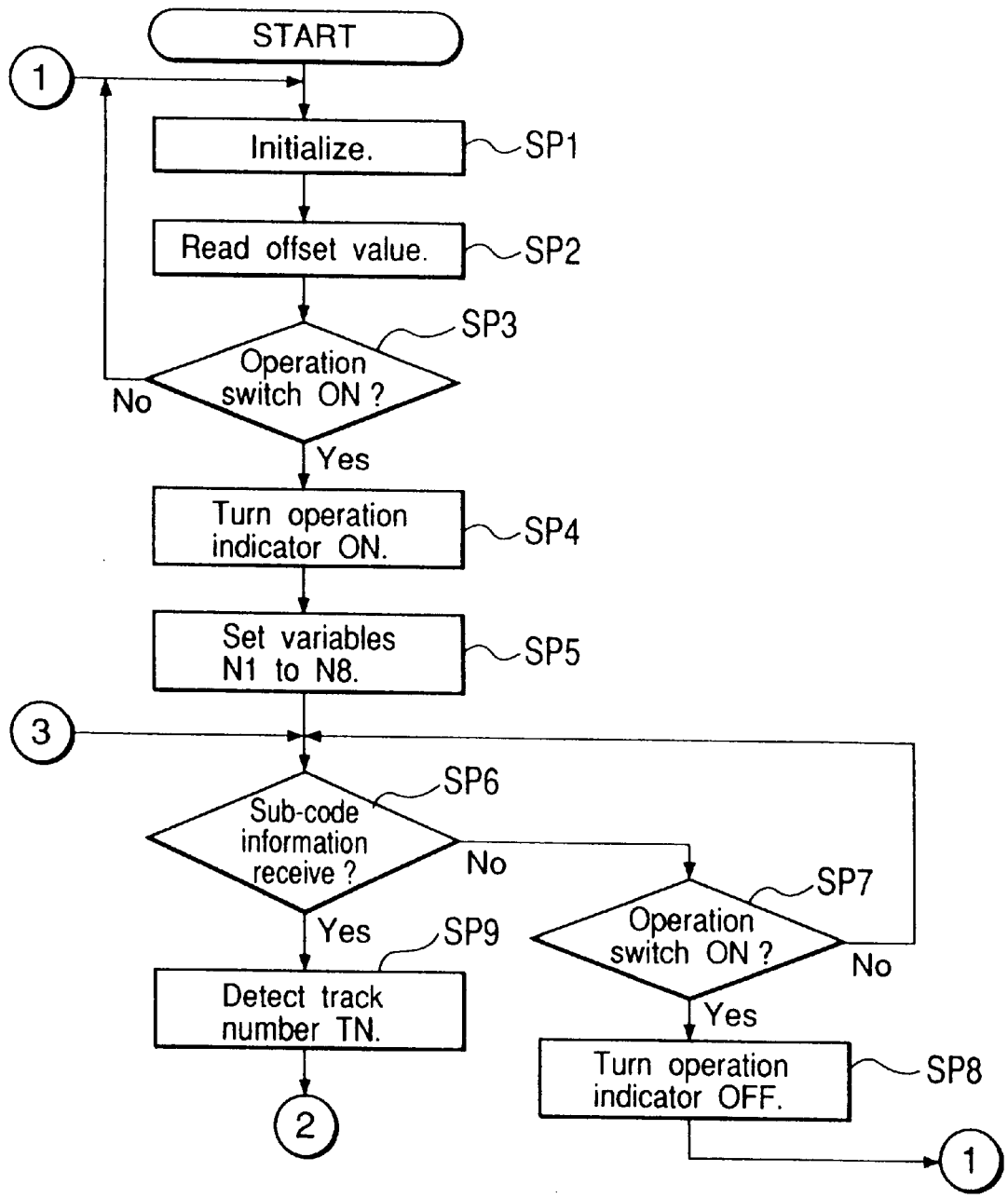
FIG. 16 is a control flow chart showing the main control portion of the second embodiment.
Figure 17:
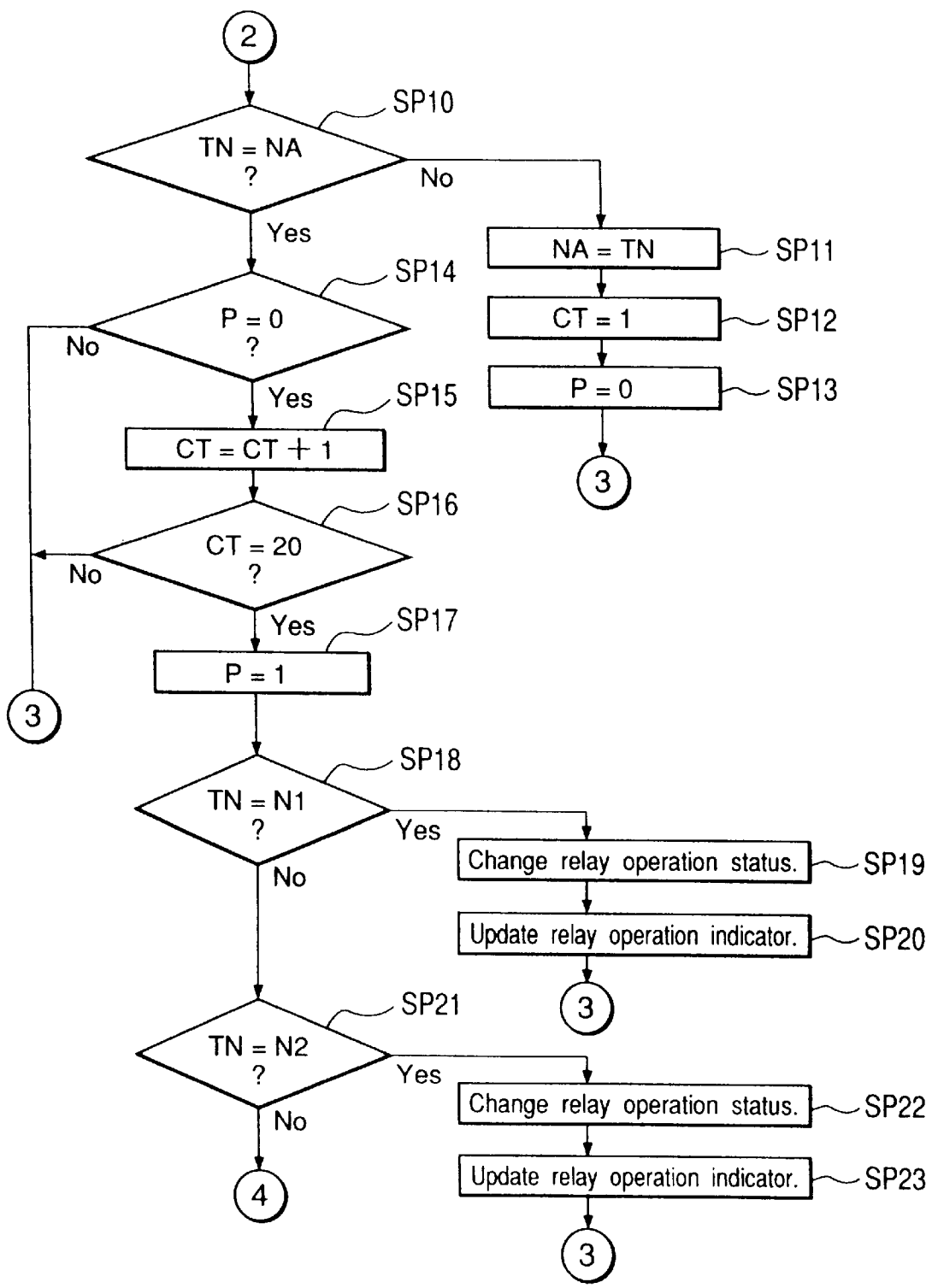
FIG. 17 is a control flow chart showing the main control portion of the second embodiment.
Figure 18:
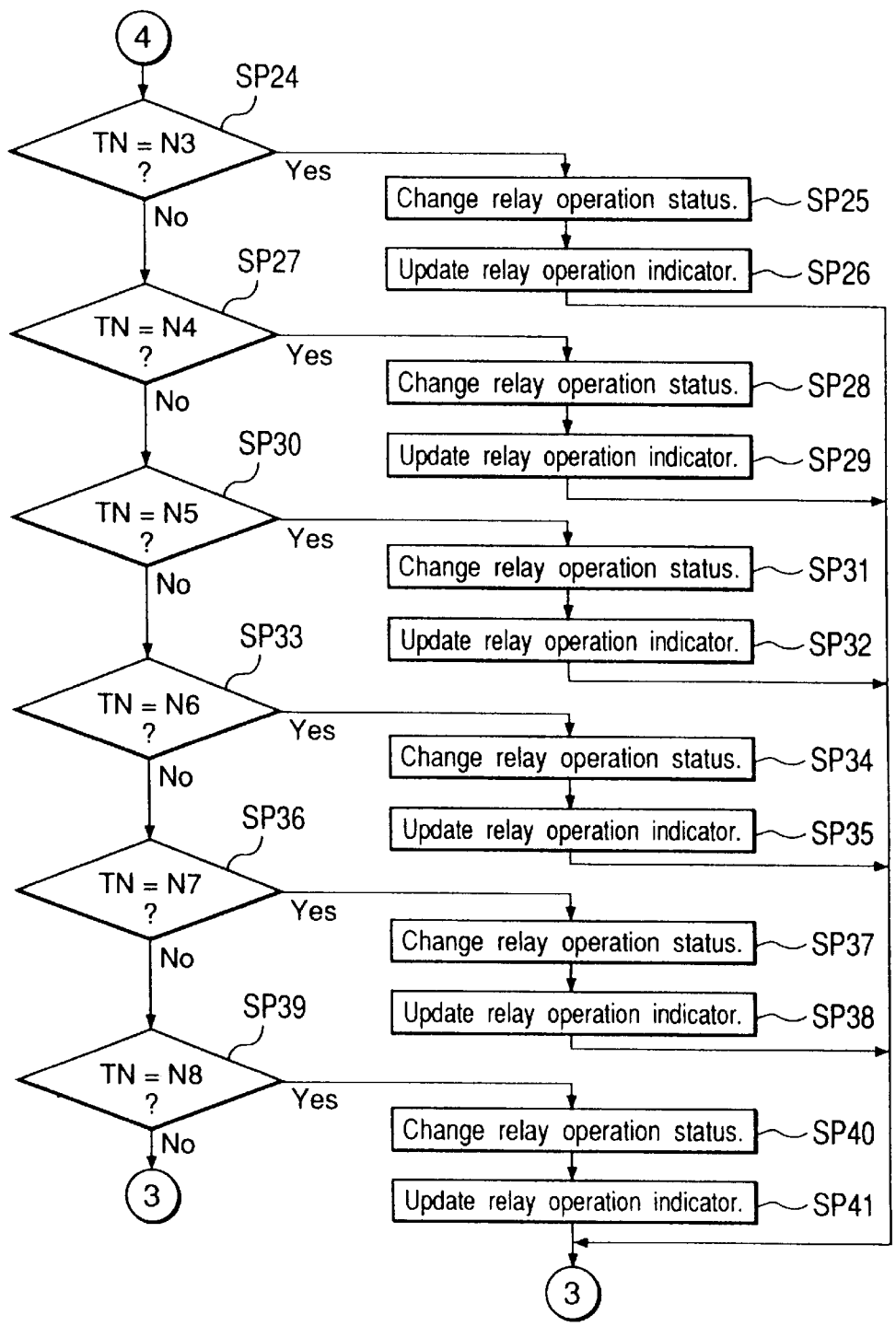
FIG. 18 is a control flow chart showing the main control portion of the second embodiment.

The operation of switch control unit 22 is described in detail referring to the control flow charts in FIGS. 16 to 18.

When the apparatus is started, the CPU in control circuit 323 sets variable N and variable NA for temporarily storing track number TN to 0, respectively, and count value CT and flag P for indicating the detection confirmed status of track number TN to 0, respectively, by way of initialization (SP1). It then reads set value K of offset value setting switch 382 (SP2) and judges whether operation switch 381 is turned ON (SP3). As a result of this judgment, if operation switch 381 is not turned ON, the CPU goes to process SP1. Otherwise, the CPU turns operation display LED 383 ON (SP4) and sets variables N1 to N8 on the basis of set value K of offset value setting switch 382 (SP5). In this example, set value K times eight is used as offset value TNoff and this offset value TNoff plus 1 to 8 are respectively set to variables N1 to N8.

Then, the CPU in control circuit 323 judges whether sub-code information is input from sub-code decode circuit 322 (SP6). If no sub-code is input, it judges whether operation switch 381 is turned ON (SP7). As the result of this judgment, if operation switch 381 is turned ON, the CPU turns operation display LED 383 OFF (SP8) and goes to process SP1. If operation switch 381 is not turned ON, it goes to process SP6.

As a result of judgment of SP6, if sub-code information is input, the CPU detects track number TN from the sub-code information (SP9) and judges whether track number TN is equal to variable NA (SP10). As the result of this judgment, if track number TN is not equal to variable NA, the CPU sets track number TN to variable NA (SP11), sets count value CT to 1 and flag P to 0 (SP12 and SP13) and goes to process SP6.

As a result of judgment of SP10, if track number TN is equal to variable NA, the CPU in control circuit 323 judges whether flag P is 0 (SP14). As a result of this judgment, if flag P is not 0, the CPU considers that track number TN detection is not confirmed and goes to process SP6. If flag P is 0, the CPU adds 1 to count value CT (SP15) and judges whether count value CT is equal to 20 (SP16). As a result of this judgment, if count value CT is not 20, the CPU considers that the same track number is not decoded consecutively for 20 frames and goes to process SP6. If count value CT is 20, the CPU considers that track number TN detection is confirmed and sets flag P to 1 (SP17) and judges whether detected track number TN is equal to variable N1 (SP18). As a result of this judgment, if track number TN is equal to variable N1, the CPU performs switching of the operation statuses of relays RL1 to RL8 to set only relay RL1 to the ON status (SP19), turns ON only relay operation display LED 384 which corresponds to relay RL1 (SP20) and goes to process SP6.

As a result of the judgment of SP18, if track number TN is not equal to variable N1, the CPU judges whether track number TN is equal to variable N2 (SP21). As a result of this judgment, if track number TN is equal to variable N2, the CPU performs the switching of operation statuses of relays RL1 to RL8 to set only relay RL2 to the ON status (SP22), turns ON only relay operation display LED 385 which corresponds to relay RL2 (SP23) and goes to process SP6.

As a result of the judgment of SP21, if track number TN is not equal to variable N2, the CPU judges whether track number TN is equal to variable N3 (SP24). As a result of this judgment, if track number TN is equal to variable N3, the CPU performs the switching of operation statuses of relays RL1 to RL8 to set only relay RL3 to the ON status (SP25), turns ON only relay operation display LED 386 which corresponds to relay RL3 (SP26) and goes to process SP6.

As a result of the judgment of SP24, if track number TN is not equal to variable N3, the CPU judges whether track number TN is equal to variable N4 (SP27). As a result of this judgment, if track number TN is equal to variable N4, the CPU performs the switching of operation statuses of relays RL1 to RL8 to set only relay RL4 to the ON status (SP28), turns ON only relay operation display LED 387 which corresponds to relay RL4 (SP29) and goes to process SP6.

As a result of the judgment of SP27, if track number TN is not equal to variable N4, the CPU judges whether track number TN is equal to variable N5 (SP30). As a result of this judgment, if track number TN is equal to variable N5, the CPU performs the switching of operation statuses of relays RL1 to RL8 to set only relay RL5 to the ON status (SP31), turns ON only relay operation display LED 388 which corresponds to relay RL5 (SP32) and goes to process SP6.

As a result of the judgment of SP30, if track number TN is not equal to variable N5, the CPU judges whether track number TN is equal to variable N6 (SP33). As a result of this judgment, if track number TN is equal to variable N6, the CPU performs the switching of operation statuses of relays RL1 to RL8 to set only relay RL6 to the ON status (SP34), turns ON only relay operation display LED 389 which corresponds to relay RL6 (SP35) and goes to process SP6.

As a result of the judgment of SP33, if track number TN is not equal to variable N6, the CPU judges whether track number TN is equal to variable N7 (SP36). As a result of this judgment, if track number TN is equal to variable N7, the CPU performs the switching of operation statuses of relays RL1 to RL8 to set only relay RL7 to the ON status (SP37), turns ON only relay operation display LED 390 which corresponds to relay RL7 (SP38) and goes to process SP6.

As a result of the judgment of SP36, if track number TN is not equal to variable N7, the CPU judges whether track number TN is equal to variable N8 (SP39). As a result of this judgment, if track number TN is equal to variable N8, the CPU performs the switching of operation statuses of relays RL1 to RL8 to set only relay RL8 to the ON status (SP40), turns ON only relay operation display LED 391 which corresponds to relay RL8 (SP41) and goes to process SP6.

According to the second embodiment, not only explanations for exhibits A1 to An may be sequentially performed by using a single optical disk player 2 as described above, but also the lighting statuses of spotlights L1 to Ln may be switched in synchronization with the explanations for exhibits A1 to An played back from an optical disk. Also, if the number of exhibits is increased, many more lights, etc., may easily be switched by connecting multiple drive switching apparatuses in parallel to the output of optical disk player 2 and changing the offset value of each drive switching apparatus.

Because relays RL1 to RL8 are controlled in response to track number TN if track number TN in the decoded sub-code information remains the same consecutively for 20 frames, no operation other than the expected operation will be performed, unlike the prior art, even if the optical disk surface is damaged or soiled and correct sub-code information fails to be decoded. Also, when track search is performed, because sub-code information played back for the search is only for a few frames, switching operation will not be performed many times in a short time, unlike the prior art, thus preventing the external devices from malfunctioning.

Because a well known optical disk player 2 may be used, any information recording position may instantaneously be accessed, eliminating the possibility of the start position of an explanation not coinciding with the associated light, thus improving operability. Also, because a general-purpose optical disk player 2 may be connected and used, the CPU capabilities incorporated into said optical disk player 2 such as remote control, random play, and program play may also be used.

It should be noted that although in the second embodiment, eight relays RL1 to RL8 are provided in external device interface unit 31 to control external devices, this invention is not limited to this alone. The number of relays may be increased or decreased any time. In addition, a means other than a relay may also be used as an interface to control an external device. For example, a circuit may be mounted which outputs a control signal to control an external device on the basis of the signal from control circuit 323.

Although the second embodiment is configured so that the playback signal of optical disk player 2 is input as optical signal PS, this invention is not limited to this alone. The same effect may be attained by using an electric signal.

Although in this embodiment, the on/off statuses of relays RL1 to R18 of external device interface unit 31 are controlled by using track number TN in sub-code information, this invention is not limited to this alone. The same effect may be attained by using the absolute time in sub-code information.

Also, although in the second embodiment, offset value setting switch 382 in drive switching apparatus 3' is of 2-bit configuration so that the offset value is changed in units of 8 tracks, this invention is not limited to this alone.

Furthermore, although in the second embodiment, the reference track numbers are set to 1 to 8, this invention is not limited to this alone. It is desirable to set the values suitable for the specific purpose.

Needless to say, although the second embodiment is configured so that drive switching apparatus 3' is provided independently of optical disk player 2, a drive switching apparatus integrating them both may also be configured to achieve the same effect.

We claim:

1. A drive switching apparatus connected at its output to external devices, the apparatus using optical disk playback information wherein an optical disk stores position information, the external devices being switched in response to the position information, the apparatus comprising:

information playback means for reproducing the position information stored on the optical disk;

memory means for storing preselected position information derived from the optical disk;

manual input means for manually altering the preselected position information stored in the memory means;

comparison means for continually comparing the position information as played back from the optical disk with the preselected position information stored in the memory means;

external device interface means, including a plurality of switches, connectable to the external devices for providing operational power thereto;

pattern storing means for storing
  (a) the current states of the plurality of switches; and
  (b) switch patterns corresponding to the position information; and a switch control means for selectively switching the switches according to the switch patterns, in response to the comparison means.

2. The apparatus set forth in claim 1 wherein the pattern storing means stores a plurality of the switch patterns for switching the state of a switch corresponding to the predetermined position information;

the apparatus further including selection means for manually selecting one of the switch patterns stored in the memory means and the pattern storing means; and further wherein the comparison means compares the contents selected by the selection means with the position information played back from the optical disk.

3. The apparatus set forth in claim 1 further comprising an alarm means for issuing an alarm if a free area of the memory means falls below a preselected threshold value.

4. The apparatus set forth in claim 1 wherein the switch control means selectively switches the switches in the external device interface means when a comparison is made by the comparison means, and the comparison means continues for a predetermined time.

5. The apparatus set forth in claim 1 further comprising a pulse signal generating means for outputting a predetermined pulse signal to the external devices in response to the comparison result of the comparison means.

6. The apparatus set forth in claim 1 wherein the position information stored on the optical disk is the information depending upon a position on the optical disk.

7. The apparatus set forth in claim 1 wherein the position information stored on the optical disk is the absolute time information previously stored as sub-code on the optical disk.

8. The apparatus set forth in claim 1 wherein the position information stored on the optical disk is the track number information previously stored as sub-code on the optical disk.

* * * * *